US012604205B2

(12) United States Patent
Stezskal et al.

(10) Patent No.: US 12,604,205 B2
(45) Date of Patent: Apr. 14, 2026

(54) MULTI-CHANNEL AUDIO RECEIVERS AND TRANSCEIVERS IN MULTI-USER AUDIO SYSTEMS, METHODS OF USING THE SAME

(71) Applicant: Shure Acquisition Holdings, Inc., Niles, IL (US)

(72) Inventors: Alex Stezskal, Algonquin, IL (US); Michael J. Goodson, Union, IL (US); Robert Mamola, Oak Park, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 359 days.

(21) Appl. No.: 18/116,167

(22) Filed: Mar. 1, 2023

(65) Prior Publication Data

US 2023/0292135 A1     Sep. 14, 2023

Related U.S. Application Data

(60) Provisional application No. 63/315,391, filed on Mar. 1, 2022.

(51) Int. Cl.
| | |
|---|---|
| *H04W 16/14* | (2009.01) |
| *G06F 3/16* | (2006.01) |
| *H04L 41/40* | (2022.01) |
| *H04S 3/00* | (2006.01) |

(52) U.S. Cl.
CPC ........... *H04W 16/14* (2013.01); *G06F 3/162* (2013.01); *H04L 41/40* (2022.05); *H04S 3/008* (2013.01); *H04S 2400/01* (2013.01)

(58) Field of Classification Search
CPC ........ H04W 16/14; G06F 3/162; H04L 41/40; H04S 3/008; H04S 2400/01; H04B 1/0003; H04B 1/20
See application file for complete search history.

(56) References Cited

U.S. PATENT DOCUMENTS

| | | | |
|---|---|---|---|
| 10,720,953 B1 | 7/2020 | Kundmann et al. | |
| 11,188,446 B2 * | 11/2021 | Green, III | ........... G06F 11/3006 |
| 11,985,488 B2 * | 5/2024 | Moles | .................... H04R 5/027 |
| 2013/0016647 A1 | 1/2013 | Marco et al. | |

(Continued)

FOREIGN PATENT DOCUMENTS

| | | |
|---|---|---|
| WO | 2017/040904 A1 | 3/2017 |
| WO | 2021/050995 A1 | 3/2021 |

OTHER PUBLICATIONS

ISA/220—Notification of Transmittal or Search Report and Written Opinion of the ISA, or the Declaration Mailed on Jun. 27, 2023 for WO Application No. PCT/US23/063489, 180 page(s).

*Primary Examiner* — Dhaval V Patel
(74) *Attorney, Agent, or Firm* — Banner & Witcoff, Ltd.

(57) ABSTRACT

The present disclosure describes systems, apparatuses, methods, and computer-readable media for multi-channel software-defined radio (SDR) audio transceivers, multi-user audio systems using the same, and methods of using the same. SDR audio transceivers can comprise an antenna and/or radio transmitter. SDR audio transceivers can be configured for multi-channel audio transmission. The multi-channel audio transmission can include wideband channels or channels allocated across a wideband of spectrum. The multi-channel audio transmission can include narrowband channels or channels allocated to a relatively narrower band of spectrum.

20 Claims, 13 Drawing Sheets

(56) References Cited

U.S. PATENT DOCUMENTS

| | | | |
|---|---|---|---|
| 2016/0316422 A1* | 10/2016 | Regan | H04W 24/02 |
| 2019/0268087 A1 | 8/2019 | Nguyen et al. | |
| 2019/0385629 A1 | 12/2019 | Moravy et al. | |
| 2023/0006712 A1* | 1/2023 | Mamola | H04B 5/72 |

* cited by examiner

MULTI-CHANNEL AUDIO RECEIVERS AND TRANSCEIVERS IN MULTI-USER AUDIO SYSTEMS, METHODS OF USING THE SAME

CROSS-REFERENCE TO RELATED APPLICATIONS

This application claims priority to, and the benefit of, U.S. Provisional Application Ser. No. 63/315,391, filed Mar. 1, 2022 and entitled "Multi-Channel Software-Defined Audio Transceivers, Multi-User Audio Systems Using the Same, and Methods of Using the Same," the entire disclosures of each of which are hereby incorporated herein by reference in their entireties for all purposes.

FIELD OF THE INVENTION

This application relates generally to high-fidelity, low latency audio systems, and more specifically to software-defined radio transceivers for audio applications, and still more specifically to multi-channel software-defined audio transceivers for wireless multi-user audio systems.

BACKGROUND

In high-fidelity, low latency audio applications, transceivers are used to transmit and receive audio payload, control information, synchronization information, and the like. Audio transceivers use radio transmissions to communicate audio, audio channel information, synchronization information, and/or the like. Digital audio transceivers transmit and/or receive audio and the like in binary form, typically stored in frames, and allocated to a particular sub-band(s) of a frequency domain of available spectral resources. Audio payload information can be carried in audio channel(s), in sub-band(s) of spectrum across one or more periods of a time domain of the available spectral resources.

BRIEF SUMMARY

Described herein are systems, apparatuses, methods, and computer-readable media for transmitting and receiving audio using a software-defined radio (SDR) audio transceiver. SDR audio transceivers can comprise an antenna and/or radio transmitter. SDR audio transceivers can be configured for multi-channel audio transmission. The multi-channel audio transmission can include wideband channels or channels allocated across a wideband of spectrum. The multi-channel audio transmission can include narrowband channels or channels allocated to a relatively narrower band of spectrum.

BRIEF DESCRIPTION OF THE DRAWINGS

For a detailed description of the preferred embodiments of the invention, reference will now be made to the accompanying drawings in which.

DETAILED DESCRIPTION

Figure 1A:
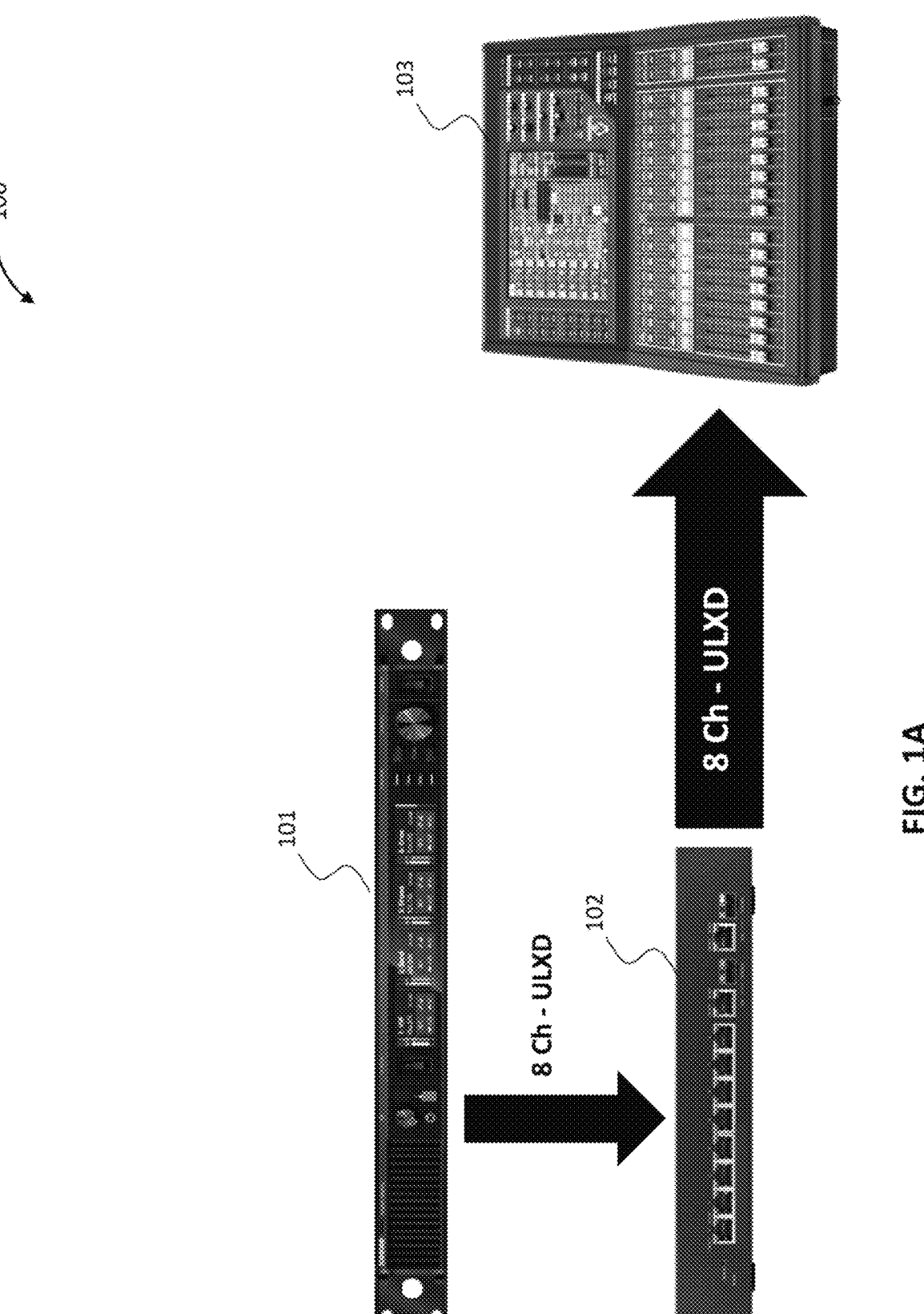
FIG. 1A is a schematic diagram of an audio system, according to an embodiment.
Figure 1B:
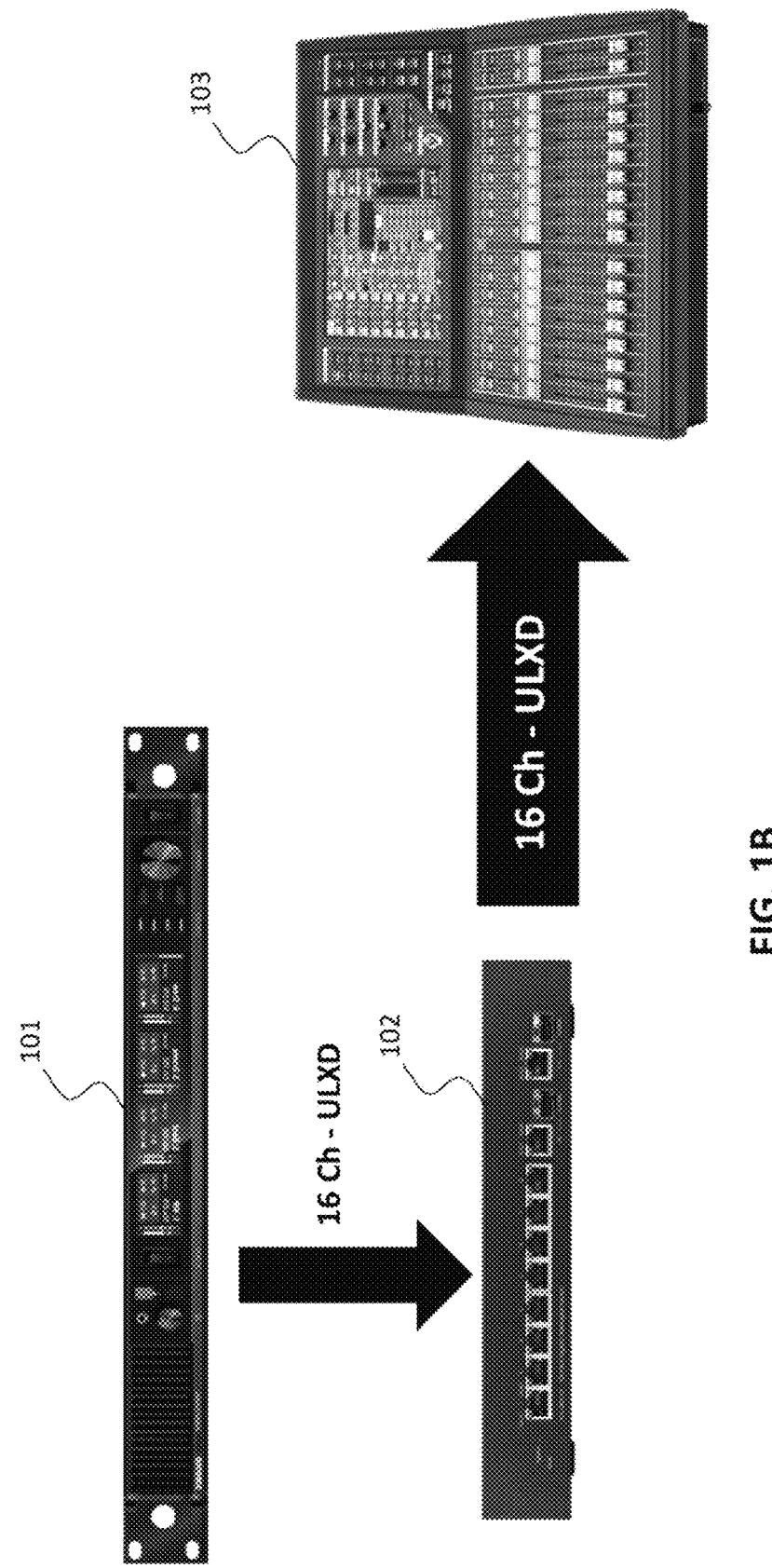
FIG. 1B is a schematic diagram of an audio system, according to an embodiment.
Figure 1C:
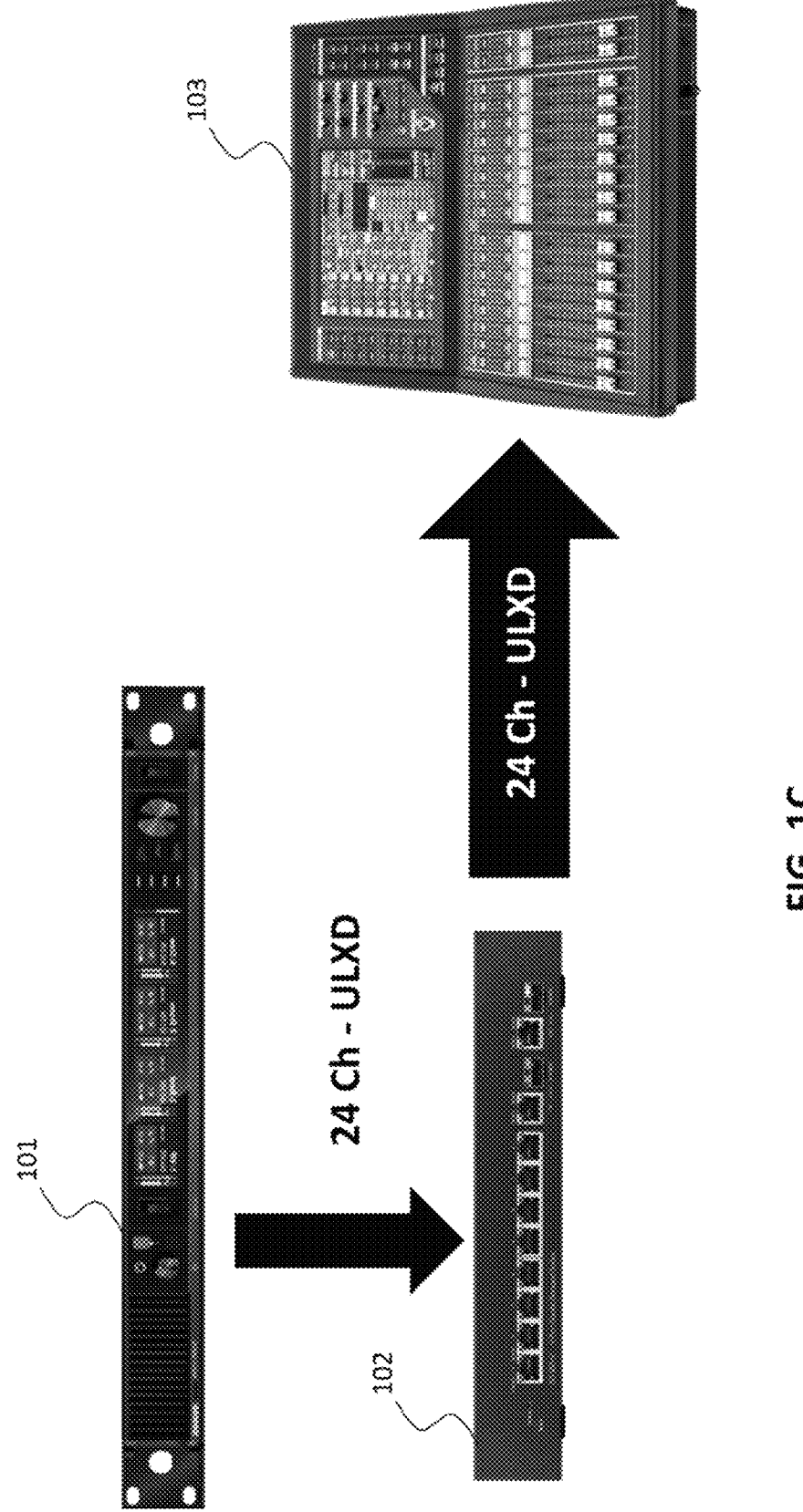
FIG. 1C is a schematic diagram of an audio system, according to an embodiment.
Figure 1D:
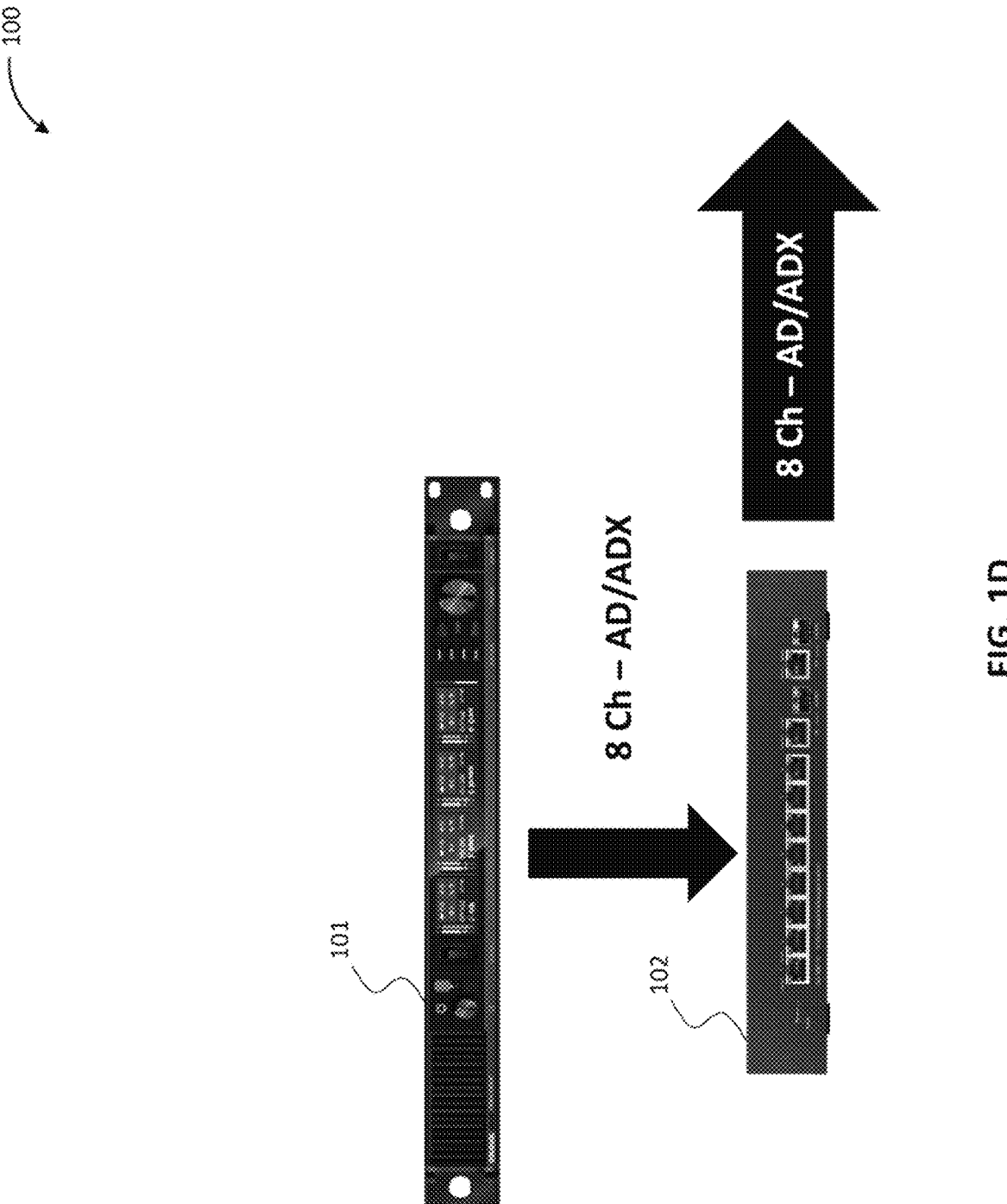
FIG. 1D is a schematic diagram of an audio system, according to an embodiment.
Figure 1E:
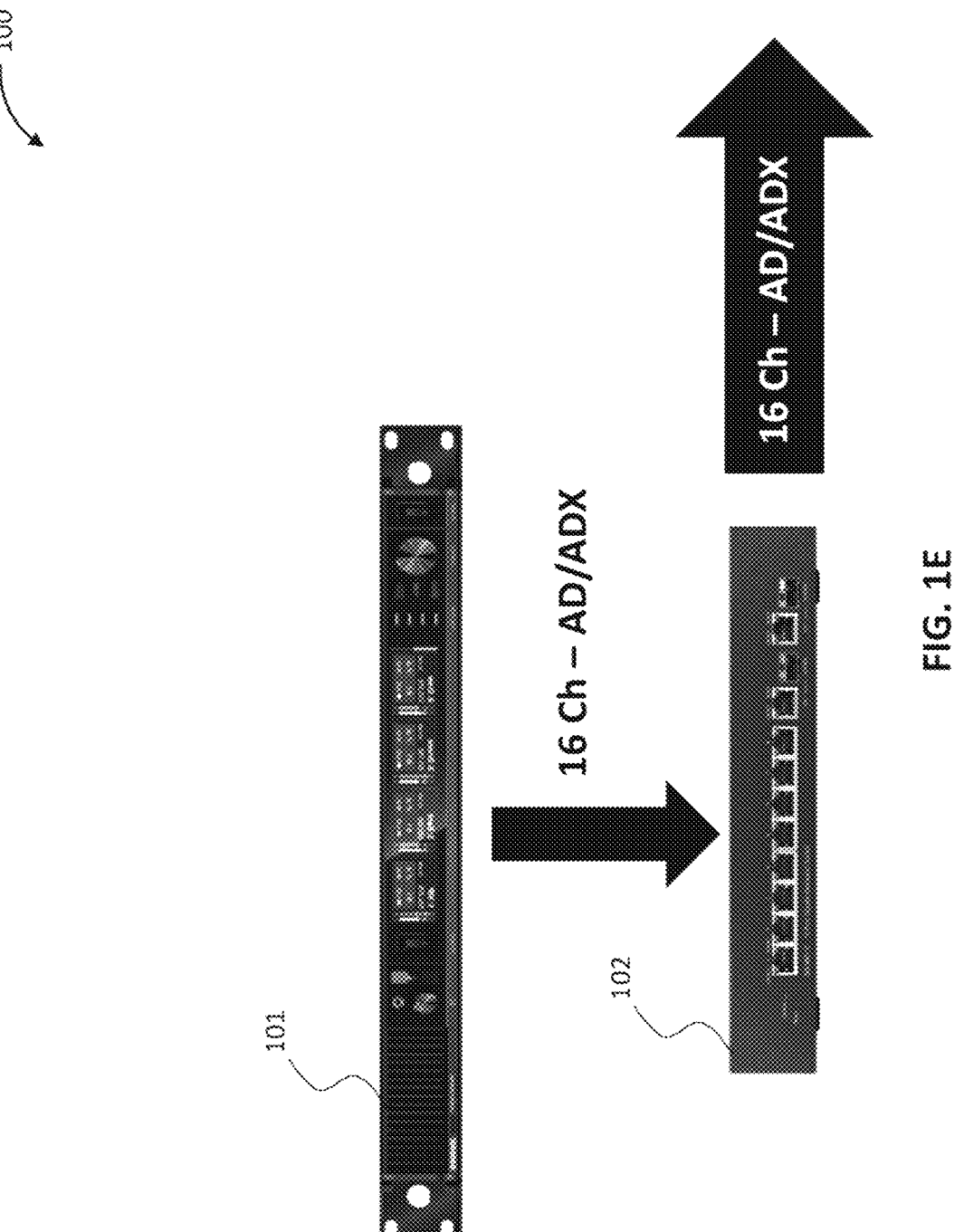
FIG. 1E is a schematic diagram of an audio system, according to an embodiment.

It should be understood at the outset that although illustrative implementations of one or more embodiments are illustrated below, the disclosed devices, systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Musicians, singers, broadcasters, newscasters, performers, conference speakers, radio hosts, and podcasters rely on audio systems that include microphones or audio sensors to capture audio. Such audio systems use speakers to broadcast audio, in-ear monitors (IEMs) and/or intercom devices to playback audio to users of the system, and mixing and/or recording devices to process or package the audio. Audio systems can be used or implemented at conference venues, live professional audio venues, concerts, live and/or recorded broadcast events, television newscasts, movies, sporting events, live or recorded rallies, and/or the like.

Audio in such systems is often transmitted wirelessly between these and/or other audio devices according to one or more different audio encoding/transmission protocols, and within one or more different regions, ranges, or sub-bands of available spectrum. Transceivers can be configured for transmitting (TX) or receiving (RX) audio in one or more audio channels.

Many transceivers are also not bandwidth flexible or configurable to listen to one or more different sub-bands or frequency ranges from among available spectral resources. Transceivers are also typically statically configured to accommodate one or a set number of audio channels. This often means that if a user desires to scale up or down the number of channels used by the audio system, the user must exchange current transceiver(s) for new transceiver(s) that accommodate a different number of audio channels.

Further, when an RF signal is received at a wireless audio receiver, the RF signal may be degraded due to multipath fading caused by constructive interference and/or by other types of interference. This degradation may cause the RF signal to have a poor signal-to-noise ratio (SNR), which can result in bit errors that can cause audio artifacts and muting of the resulting output audio. However, muting the output audio is undesirable in many situations and environments, such as during professional stage productions and concerts. The effects of such multipath fading and interference are most prevalent in harsh RF environments where physical and electrical factors influence the transmission and reception of RF signals, e.g., movement of the microphone within the environment, other RF signals, operation in large venues, etc.

To alleviate issues with multipath fading of RF signals, wireless audio components may utilize frequency diversity and/or antenna diversity techniques. In particular, wireless audio transmitters may utilize frequency diversity to simultaneously transmit on one antenna two RF signals of two separate frequencies in a combined RF signal, where the two RF signals both include the same audio signal. A wireless audio receiver may then use one or both of the underlying RF signals. In addition, wireless audio receivers may utilize antenna diversity to simultaneously receive RF signals from a wireless audio transmitter on multiple antennas. The received RF signals can be combined to produce a single audio output.

A two-antenna system may not be sufficient to provide adequate performance. More than two antennas may be desired in order to benefit from the use of antennas with different directional gains so that the coverage of the wireless system is extended. For example, a particular venue may have multiple "zones" that need to be covered by a single wireless receiver and/or a venue may be very large. In these situations, having more than two antenna locations may result in improved coverage and reduced transmitter to antenna distances.

When utilizing frequency diversity and/or antenna diversity techniques, some wireless audio receivers might combine multiple RF signals received on multiple antennas by scaling each RF signal proportionally using maximal-ratio combining (MRC) under the assumption that there is equal noise power in each RF signal. However, if the antennas are subjected to asymmetrical noise, e.g., when one antenna is closer to a source of interference, then MRC does not maximize the signal-to-noise ratio of the combined signal. This can cause the receiver to produce non-optimal audio output, such as degraded sound or muting.

Multiple RF signals may be flexibly routed to different RF analog processing modules in different selectable modes. The SNR of a combined signal can be increased and/or maximized by combining multiple RF signals by scaling them proportionally to their respective SNR. Received RF signals can be cascaded to allow daisy chaining of receivers. Additional, redundant channels of RF processing can be allocated to additional antenna inputs for mission critical audio sources. Fewer RF processing channels can be allocated to a given audio channel to increase and/or maximize the number of audio channels that can be decoded. Some non-limiting examples of such frequency diversity/antenna diversity mode approaches are described in commonly owned U.S. Pat. No. 10,069,525, the entire disclosure of which is hereby incorporated herein by reference in its entirety for all purposes.

Described herein are transceivers, such as multi-channel audio receivers (MCRs), that are configured for receiving audio via a large number of audio channels. An MCR may be configured to include a spectrum manager, e.g., a digital spectrum manager, for demodulating different audio signals received across an extended tuning bandwidth. The spectrum manager can employ operations configured for scanning a wide bandwidth of spectrum. The spectrum manager can employ further operations configured for assessing which frequencies are suitable for wireless audio transmission. In various embodiments described herein, an MCR may include functionality in a single device that is distributed across multiple devices in less desirable systems.

The MCR can be compatible with narrowband or wideband devices and associated audio systems. Connected portable devices, such as uplink transmitters, in some audio systems may not be coordinated subscribers, but instead act as independent, asynchronous transmitters. There may not be any backlink from the MCR to the portable device(s) or tuning to a reference for timing and/or frequency synchronization. Accordingly, in some MCR systems, the synchronization of each uplink transmission to the MCR may be carried out by a software defined radio (SDR), such as using one or more digital signal processing (DSP) algorithms for resampling each transmission independently.

The MCR can be compatible with narrowband transceivers, such as wireless transmitters. The MCR may be configured to communicate with uplink transmitters that are timing/frequency synchronized to a reference, such as a master clock or the like. In such embodiments, the spectrum manger can be configured to lock a baseband clock for subscribers in a wireless microphone system to an access point by generating respective baseband clocks from a common reference. The access point or MCR and/or other subscriber devices can include one or more baseband clocks (i.e., controlling an audio sample clock and/or data sample clock) that are set based on reference oscillators.

Embodiments of the present disclosure may include tuning the reference oscillators of each subscriber device based on measured phase differences, such that the baseband clocks of all the subscribers and the access point are in sync. Additional information and details regarding digital spectrum management and timing synchronization are provided in commonly owned U.S. U.S. Pat. No. 10,944,535, the entire disclosure of which is hereby incorporated herein by reference in its entirety for all purposes.

The MCR can comprise or be in communication with a spectrum analyzer configured to listen for particular subbands from among a wideband of spectrum in order to sample a received signal for audio information (e.g., audio payload subcarriers) associated with one or more particular audio channels.

In embodiments in which the MCR is a less or not compatible with narrowband wireless audio devices, for example, the MCR can be tuned to a reference frequency (i.e., reference oscillator) based on sample clock timing (i.e. phase) offset measurements between the subscriber and an access point, that are taken for each frame during communication between the access point and the subscriber device (e.g., MCR).

An MCR can be configured to implement various mixing modules, filters, amplifiers, modulators/demodulators, detectors, and/or the like, which would otherwise be implemented by way of additional hardware, and which are instead implemented by way of computer-readable media storing software-defined radio (SDR) modules using local or remote computing hardware. The MCR can include SDR antennas that adaptively lock onto signals and eliminate or reduce interference from adjacent signals, channels, and/or the like. Non-limiting examples of systems incorporating overlapping bands and adaptive locking of SDR antennas to signals to eliminate or reduce interference from adjacent signals/channels are provided in commonly owned U.S. Pat.

No. 10,720,953, the entire disclosure of which is hereby incorporated herein by reference in its entirety for all purposes.

Additional example MCR devices and MCR implementations are provided below with reference to FIGS. 1A-9. The depicted example MCR devices and implementations are provided to illustrate a variety of different audio channel capacities that can be accommodated for use with different wireless transmitters and/or in different multi-user audio systems.

FIG. 1A-1E illustrate various embodiments of an audio system 100 that includes an MCR 101 and a network switch 102. The depicted MCR 101 is in communication with the network switch 102. The MCR 101 can include or be in communication with one or more antennas (not shown). Some example embodiments, such as those illustrated in FIGS. 1A-1C, also include an audio console 103 in communication with the network switch 102.

The MCR 101 is configured to accommodate a large number of different audio channels, such as 1, 2, 4, 8, 12, 16, 20, 24, and/or more. The MCR 101 can be configured locally or remotely to accommodate less or more audio channels. A user, for example, can initially purchase and/or install the MCR 101 in an example audio system 100 that is configured to accommodate up to 12 audio channels. The user may initially license the 12 audio channel configuration and the MCR 101 may be configured to limit its audio channels to 12.

If user requirements for a particular use case change, such that the user determines that it is necessary to increase the number of audio channels, the MCR 101 is configurable to accommodate this change. For example, the user can license additional audio channels and the MCR 101 can be locally and/or remotely reconfigured to accommodate the additionally licensed audio channels, e.g., four additional audio channels such that the MCR 101 is now configured to accommodate up to 16 audio channels. If user requirements for the particular use case change such that the user no longer needs the additional audio channel capacity for the MCR 101, the user can relinquish the additional license(s), e.g., the four additional audio channels such that the MCR 101 can be locally and/or remotely reconfigured to accommodate the original 12 audio channels.

The MCR 101 can comprise a processor configured to operate one or more software defined radio functions, a memory in operable communication with the processor, the memory storing program code, and an integrated circuit (IC) in operable communication with the processor.

The memory and the program code of the MCR 101 can be configured, with the processor and the IC, to cause the MCR 101 to scan for available spectrum, such as by using a portion of total configurable audio channels, a portion of audio channelization resources, a portion of one or more resources (e.g., antenna time and/or directionality, antenna resource use, logical channel mapping, audio channel transmission scheduling, etc.), for scanning. The scanning can be carried out in-band/intra-band within a particular sub-band (e.g., a 70 MHz sub-band) of spectrum, and/or can be carried out cross-band/inter-band between different sub-bands (e.g., between different 70 MHz sub-bands) of spectrum. The MCR 101 can determine antenna configuration(s), audio channel number, channelization characteristics, audio channel allocation, transmission mode(s), or the like, based on said scanning for available spectrum.

The MCR 101 can, for example, cause the IC to map audio channels according to a new allocation schema, or reconfigure an antenna/antenna array for the MCR 101 based on the available spectrum scan. The spectrum scan can also or alternatively be a spectral quality/transmission quality scan, which may lead the MCR 101 to be reconfigured for channel quality reasons, interference reduction reasons, or the like, whether or not there are spectrum availability concerns.

Alternatively or additionally, the MCR 101 can be configured to transmit information about the available spectrum to the network switch 102. The network switch 102 can, in response to receiving from the MCR 101 the information about the available spectrum, generate configurational information/audio channel allocation information, or the like (such as describe above and elsewhere herein), and provide the same to the MCR 101. Based on the configurational information or audio channel allocation information, or the like, the MCR 101 can be reconfigured to accommodate the new number of audio channels, to accommodate the new audio channel allocation/logical channel mapping, adjust the antenna transmission mode(s), and/or the like.

Licenses, as referred to herein, can take any suitable form and can be conveyed via any suitable manner between a licensor and a licensee. For example, a license can comprise a digital key, digital permissions, an access code, a reconfiguration file, or the like. The MCR 101 may be configured to be in communication, via a network, with one or more computing devices that provide for reception, implementation, and authentication of the license at the MCR 101. The MCR 101 may be configured to automatically be reconfigured to accommodate additional audio channels based upon the receipt of a license, key, permissions file, access code, signal, or the like. Licenses can also or alternatively be implemented by way of a transient signal, a hardware key or dongle, a user-enterable value or license key, a license file, or the like.

The MCR 101 may include or be in communication with additional lateral hardware that can facilitate reconfiguration of the MCR 101 to accommodate the additional audio channels. The MCR 101 may include or be in communication with additional lateral hardware that can be used directly for increasing the audio channel capacity of the MCR 101. Said otherwise, the additional lateral hardware may provide additional antennas, computing capacity, demodulation units, digital-to-analog filters, analog-to-digital filters, fast Fourier transform (FFT)/inverse FFT (IFFT) modules, and/or the like.

For example, the MCR 101 can be configured to receive a license, such as a digital license key, or other suitable information that can indicate to the MCR 101 a particular channel capacity that should be permitted. The license can be received wirelessly or via a wired connection, from a local audio system component or via the Internet.

The MCR 101 can comprise a reconfigurable component, such as a logic block array comprising a plurality of programmable interconnects that can be selectively programmed using a hardware description language (HDL) or the like. The MCR 101 can be configured to determine, from the digital license key, a number of audio channels being licensed, and set the programmable interconnects of the logic block array such that the MCR 101 can accommodate the correct number of audio channels being licensed.

Different logic block arrays, such as field-programmable gate array images can be provided to support different audio channel configurations, different numbers of audio channels, different channel types, and/or the like. When multiple FPGAs or the like are provided for different audio channel configurations, different audio types, different numbers of audio channels, and/or the like, the MCR 101 can be configured for joint spectrum analysis. The MCR 101 can be configured to scan wideband VHF to 2 GHz to provide information regarding available spectrum to users. The MCR 101 can also be configured to provide backup frequencies for deployment if needed.

The FPGA can be a high performance FPGA configured for wide tunability. For example, a high performance FPGA can be configured for a wide range of frequency tunability and/or simultaneous reception and/or transmission of multiple channels. The MCR 101 can also be configured for front end wide capture. The spectrum manager, e.g., digital spectrum manager, can be configured to listen via one channel on frequency modulation (FM) or Axient Digital®, in a high definition mode or a standard mode.

In order to accommodate wideband tunability, for example, the MCR 101 can include a larger number of antennas. The MCR 101 can be configured to support multiple different antenna configurations, multiple different numbers of configurations, multiple different audio channel modes, multiple different modulation schemes, and/or the like. For example, the MCR 101 can be configured to support ULXD alongside, Axient Digital®, HD mode, FM, and/or the like. Some or all of the different modes can have or be allocated to a certain amount of bandwidth.

Particular different masks can be provided in order to achieve certain audio qualities and/or for certain modulation schemes. For certain different transmission modes or channel types, different antenna configurations, different switched diversity, different FPGA configurations, and the like can be used to accommodate one or more of the different transmission modes or channel types.

Different transmission modes or audio system applications can employ different codecs having different latency implications. The MCR 101 can be configured to support full transmission mode diversity, to accommodate different inputs simultaneously, can be configured to vary input numbers, and the like.

The MCR 101 can transmit and/or receive data, particularly audio data. Radio frequency (RF) signals may be received via the one or more antennas from a wireless audio transmitter and/or a microphone, for example, that has captured the sound of a production or other audio source. The MCR 101 can be configured to communicate with or receive audio data in parallel with one or more other transceivers. The MCR 101 may operate a single channel, or may operate multiple channels simultaneously. As such, the MCR 101, alone and/or in combination with other transceivers, can operate using either or both frequency diversity and antenna diversity.

The MCR 101 can be configured to operate independently from other transceivers. The MCR 101 may have a corresponding center frequency and a bandwidth, which may be independently tunable from all other transceivers in the audio system. The MCR 101 may also be configured to operate in a diversity configuration.

Diversity operation can include the MCR 101 causing one or more antennas to receive a signal from the same source. As a particular example, antenna diversity involving the use of two or more antennas may be especially effective at mitigating multipath situations in which interference is introduced into a signal via differences in signal propagation as a signal travels from a source to the antenna. Each antenna will experience a different interference environment. Thus, if one antenna is experiencing a deep fade, another antenna may have a relatively improved or even a sufficient signal. The dual antenna configuration thus provides additional robustness, improving the signal quality and allowing for more robust communication without dropouts or signal loss. Antenna diversity can include using physically separated antennas (i.e., antennas positioned apart in space) in order to receive the same source signal at two different locations.

Antenna diversity is described above as using two antennas, but it should be appreciated that "diversity" operation can include the use of one, three, or more antennas (i.e., M antennas) as well. Such a diversity operation can be termed a Quadversity™ mode in instances in which four antennas are used for antenna diversity.

The MCR 101 can be configured to accommodate, for example, two audio channels having different transmission modes and four audio channels in the Quadversity™ mode for a total of up to eight inputs. Other embodiments can accommodate more or different audio channel inputs at the MCR 101.

The MCR 101 can be configured to enable operation in various modes that include diversity (e.g., one, two, or more (M) antenna diversity) and multi-transceiver diversity (e.g., two, three, four or more (2M) antenna diversity), wherein an operational bandwidth of the system can include portions that are covered by either diversity or multi-transceiver diversity.

The MCR 101 can be configured to mix and match different audio channel types or transmission modes for the same receiver during a same period of time. Alternatively, the entire MCR 101 can be configured for or switched into a single mode for a single audio transmission mode or audio channel type, e.g., ULXD, QLXD, etc.

The MCR 101 can include a software-defined integrated circuit and a processor and/or microcontroller configured to carry out the reconfiguration of the logic block array. The software-defined integrated circuit and processor can be configured to carry out at least some of a variety of different receiver capabilities, such as filtering, mixing, denoising, amplification, modulation, demodulation, detection, etc., such that the MCR 101 acts as or comprises a software-defined radio communication system.

The MCR 101 can include one or more integrated circuits that can act as a controller and/or tuner for digital signal processing, demodulation, radio frequency filtering, audio frequency filtering, signal enhancement, equalization, binaural presentation, and/or bandpass filtering, timing offset correction, frequency offset correction, and/or the like.

The particular configuration of the logic block array can also indicate to a field programmable antenna array how many antennas should be active in order to accommodate the correct number of audio channels being licensed.

The MCR 101 can also include a plurality of receiver modules configured to carry out separate software-defined radio capabilities. The MCR 101 can be configured to, based on the digital license key stored and/or received at the MCR 101, activate and/or deactivate a number of receiver modules in order to accommodate the correct number of audio channels being licensed. Depending on the application, such as when the audio system is deployed for a professional audio application, live broadcast application, or the like, improved audio quality requirements such as audio latency, fidelity, user experience, turnaround time, turn-on-to-audio time, and/or some combination thereof can be achieved by carrying out various signal processing functions using software-defined radio functions of the MCR 101 as described herein.

The MCR 101 can be configured for joint spectrum scanning and spectrum analysis. The MCR 101 can be configured to scan for available spectrum and present the available spectrum to users. The MCR 101 can be configured to simultaneously receive audio payload and scan for available spectrum. The term "simultaneously" as used in this context is not limited to simultaneous action in the absolute sense but rather refers to simultaneous, near simultaneous, and/or parallel audio payload reception and scanning operations conducted by a single MCR 101 device. The MCR 101 can be configured to provide information about available spectrum to an access point/baseband device, which can then determine audio channel allocation within the available spectrum accordingly. Alternatively, the MCR 101 can be configured to determine internally (i.e., without use of an access point/baseband device) audio channel allocation within the available spectrum, and assign/reassign audio channels withing the available spectrum.

Figure 2:
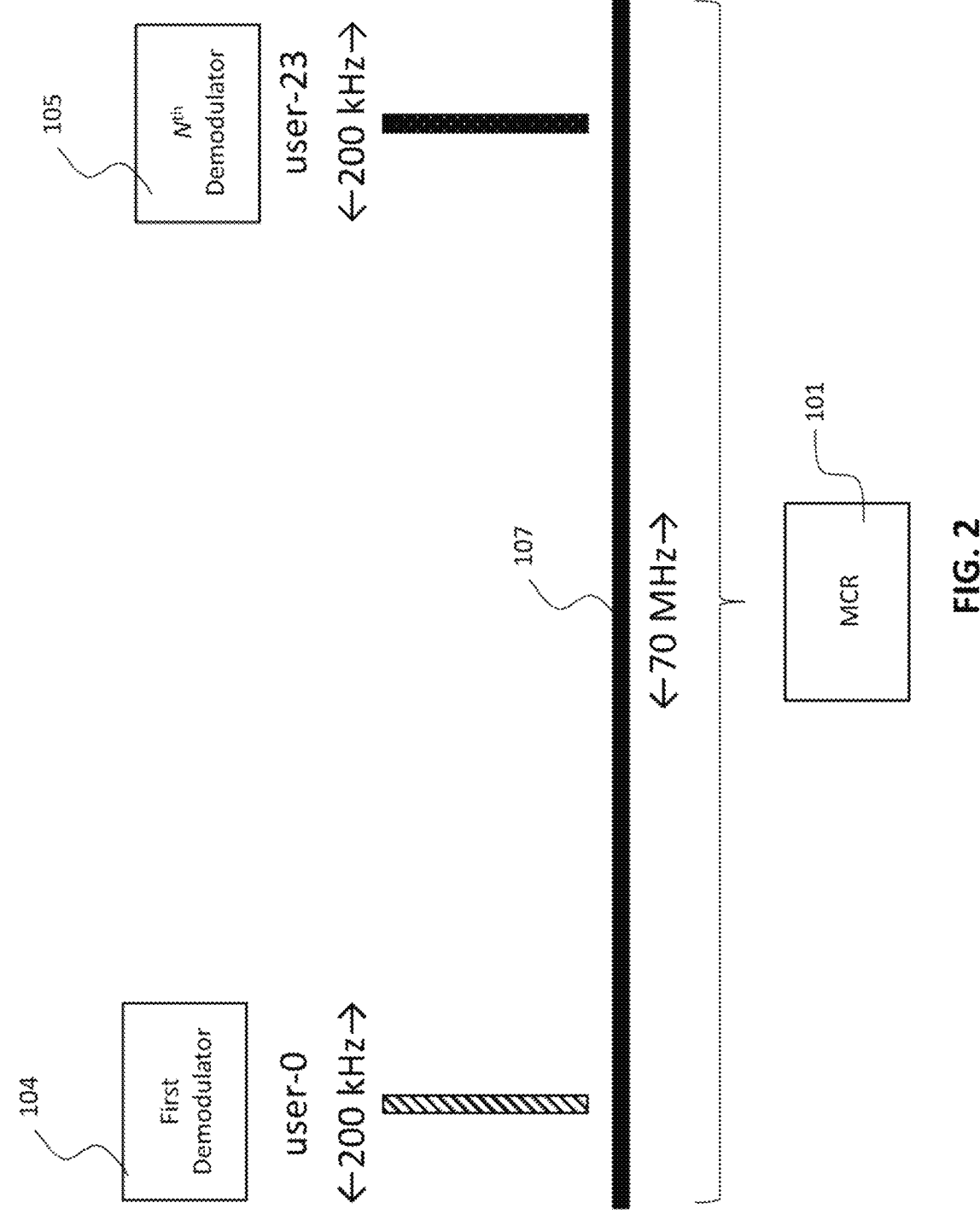
FIG. 2 is a schematic diagram of an audio channel allocation approach, according to an embodiment.

Referring also to FIG. 2, the MCR 101 can be configured to scan for available spectrum initially, such as upon power up or wake-up. The MCR 101 can carry out the initial scan using a scanning engine, microcontroller unit (MCU), processor, excess FPGA capacity, or the like. For example, the MCR 101 can include a MCU or processor (e.g., such as processor 207 in FIG. 3) that can control and/or carry out scanning for available spectrum, e.g., using the FPGA or the like. The MCR 101 can scan for available spectrum from among a full range of spectrum that is able to be occupied/used locally based on interference, local regulations, and/or the like. Additionally or alternatively, the MCR 101 can scan for available spectrum from among only a portion of available spectrum initially. Based on the initial scan for available spectrum, the MCR 101 can determine at least a portion (e.g., a 70 MHz portion) of the available spectrum in which to allocate audio channels for one or more wireless devices.

The MCR 101 can include a processor and memory that stores program codes. The MCR 101 can be configured to determine an initial audio channel allocation for a plurality of audio channels within a first candidate channelization portion (e.g., the 70 MHz portion 107 illustrated in FIG. 2 as discussed below) of the available spectrum. The MCR 101 can be configured to receive digitized audio associated with at least one of the plurality of audio channels within one or more audio payload carrying sub-bands of the first candidate channelization portion of the available spectrum. The MCR 101 can further be configured to identify the one or more audio payload carrying sub-bands within the first candidate channelization portion of the available spectrum based on the initial audio channel allocation. The MCR 101 can be further configured to cause at least a portion of an integrated circuit (IC) or the like to carry out a second scan for available spectrum using at least one of the one or more antennas. The MCR 101 can be further configured to determine, based at least on such second scan for available spectrum, a subsequent audio channel allocation for the plurality of audio channels within the first candidate channelization portion of the available spectrum or within a second candidate channelization portion of the available spectrum. The MCR 101 can be configured to cause at least the portion of the IC to carry out said second scan for available spectrum simultaneously with receiving the digitized audio, identifying the one or more audio payload carrying sub-bands within the first candidate channelization portion of the available spectrum, and/or demodulating the digitized audio associated with the at least one of the plurality of audio channels.

An example initial audio channel allocation of sub-bands of spectrum over a particular time period to wireless devices is illustrated in FIG. 2 as the two 200 kHz sub-bands of the 70 MHz portion 107 (e.g., the first candidate channelization portion) of available spectrum that are mapped to/associated with wireless devices, such as wireless microphones, IEM devices, wireless speakers, instrument microphones, and/or the like. Herein, such wireless devices can also be referred to as demodulators. In FIG. 2, the first 70 MHz portion 107 of the spectrum is illustrated as including at least two sub-bands that are allocated to a first demodulator 104 and an $N^{th}$ demodulator 105.

The first 70 MHz portion 107 of the available spectrum, as illustrated in FIG. 2, therefore represents a sub-band overlap region (or encompasses) assigned/allocated spectrum for the demodulators 104 and 105 and/or other demodulators such as demodulators assigned/allocated to sub-bands interstitial to those illustrated for demodulators 104 and 105 (collectively, "demodulators 104, 105"). The range for a particular demodulator can be, e.g., 200 kHz or the like, within the, e.g., 70 MHz range.

The MCR 101 can, during initial channelization/audio channel allocation, look to other, non-overlapping ranges, such as a second non-overlapping 70 MHz portion of the spectrum (not shown) that is distinct and different from that of the first 70 MHz portion 107 of the spectrum. For example, as illustrated in FIG. 2, the MCR 101 can enable a 24 audio channel capacity for audio channels associated with a number of different demodulators, such as 24 different demodulators, and these audio channels can be allocated initially or perpetually to the first 70 MHz portion 107 of the available spectrum. Each of the 24 different demodulators is not shown in FIG. 2 for ease of illustration but are represented by demodulators 104, 105, which are associated with user-0 and user-23. For purposes of the foregoing discussion, any reference to demodulators 104, 105 might similarly refer to twenty-two additional demodulators that are not shown but which could be assigned/allocated to other sub-bands of the first 70 MHz portion 107 of the available spectrum between those allocated to user-0 and user-23.

After initial channelization/audio channel allocation, the MCR 101 can be configured to carry out receiving/demodulation activities for the demodulators 104, 105, based on the initial channelization/audio channel allocation determined following the initial scan for available spectrum. The MCR 101 can be configured to statically assign/allocate sub-bands of the first 70 MHz portion 107 of available spectrum to the demodulators 104, 105, and/or can be configured to at least partially dynamically assign/allocate sub-bands to demodulators 104, 105 based on information determined or received about the available spectrum remaining in the first 70 MHz portion 107, changes in the available spectrum, audio channel quality, audio payload traffic, changes in audio channel quality requirements, and/or the like.

The MCR 101 can be configured to determine information about available spectrum or initially allocated audio channels based upon external or internal spectrum scanning capabilities. The MCR 101 can be configured to scan for available spectrum within the first 70 MHz portion 107 of spectrum, such as between sub-bands allocated to audio channels for demodulators 104, 105.

The depicted MCR 101 embodiment can be configured to conduct scans of alternative sub-bands within the first 70 MHz portion 107 of spectrum illustrated in FIG. 2 to determine if reassignment/reallocation of one or more audio channels associated with any particular user or demodulator would benefit audio channel quality, network traffic, interference avoidance, latency, demodulation accuracy, decoding error rate reduction, and/or the like. The MCR 101 can be configured to carry out such scans at any time while awake/active. Notably, the MCR 101 can be configured to carry out such scans while simultaneously managing the receipt of audio payload via the audio channels allocated to demodulators 104, 105.

The MCR 101 can be configured to, in parallel/simultaneously with, and/or independent from, demodulating/decoding the audio channels for the demodulators 104, 105, and other audio channels assigned/allocated to other users/demodulators therebetween, scan other portions of the first 70 MHz portion 107 of the available spectrum, to evaluate spectrum availability, determine interference potential, predict audio channel quality for other possible audio channel assignment/allocation schemes, and/or the like.

The MCR 101 can additionally or alternatively be configured to, in parallel/simultaneously with modulating/demodulating the audio channels for the demodulators 104, 105, and other audio channels assigned/allocated to other users/demodulators therebetween, scan at least portions of the second 70 MHz (e.g., a second candidate channelization portion that is not shown) of the available spectrum and/or other portions of the available spectrum to evaluate spectrum availability, determine interference potential, predict audio channel quality for other possible audio channel assignment/allocation schemes, and/or the like. As such, the MCR 101 can be configured to determine/evaluate spectrum availability and evaluate audio channel current/proposed mapping schemes, without halting audio transmission/demodulation activities using the existing audio channel assignment/allocation schema.

The MCR 101 can be configured to instantiate a scanning engine or the like, depending on FPGA capacity or other processing/circuitry capacity, to carry out the spectrum frequency scanning functionality described herein and improve audio channel allocation in terms of audio channel quality/interference avoidance. Notably, in various embodiments, the MCR 101 attributed spectrum scanning, analysis, audio channel allocation, and audio channel re-allocation discussed herein is enabled by the same device as that which is carrying out receiving/demodulation of audio payload from the demodulators 104, 105.

Without wishing to be bound by any particular theory, because the audio channel allocation, receiving, and demodulation of audio payload are carried out in the same device (e.g., MCR 101) as the instantiated scanning engine that scans in parallel/simultaneously with the allocation/receiving/demodulation activities, various embodiments discussed herein enable efficiency gains in terms of time and resource use for scanning for available spectrum and allocating/reallocating audio channels accordingly, because the same device already has access to current audio channel allocation information, audio payload traffic information, interference information, audio channel quality information, and/or the like. The efficiency gains associated with MCR 101 embodiments discussed herein are estimated at 2 to 3 times the performance of systems relying on coordination with external hardware/devices for channelization/audio channel allocation.

Since the MCR 101 can be configured to carry out scanning for available spectrum and determining audio channel allocation/reallocation for particular demodulators, 104, 105, the MCR 101 can achieve relatively quick audio channel allocation/reallocation and improved tuning of wireless devices to receiver, relative to systems that rely on external scanning capabilities, external devices for indicating audio channel allocation, external instructions for wireless transceiver tuning/retuning with a receiver, and/or the like.

Additionally, the described MCR 101 can reduce or eliminate the need for external device signaling and or system coordination related to scanning and channel allocation operations. External coordination, such as with a baseband device, can introduce additional interference and error risk, increase the turn-on-to-tuned time for wireless microphones and the like, increase the time it takes for audio channel reallocation, and can lead to other undesirable outcomes. As such, the MCR 101 can reduce the inter-device coordination needed, reduce computational complexity, reduce inter-device signaling requirements, reduce the computing time, reduce perceived audio latency, and overall improve the user experience for a user of a wireless microphone or other such device assigned/allocated to a sub-band of available spectrum by the MCR 101. An added benefit of the MCR 101 as described herein is that it reduces or eliminates the need for additional hardware to carry out initial/subsequent spectrum analyses, determine initial/subsequent audio channel allocations, and the like.

In another embodiment, an MCR 101 may be configured to support up to 24 active audio channels for wireless microphones in a multi-user audio system, and the MCR 101 may be configured to reserve audio channels 1-12 for active frequency/spectrum scanning, while assigning audio channels 13-24 for carrying audio payload from one or more wireless microphones via over-the-air transmission. Audio channels 13-24 can be allocated on a one audio channel-to-one wireless microphone basis. However, the audio channel allocation for audio payload can be flexible, such that it can be changed upon demand, and/or over time based on available spectrum scan results, or the like.

Additionally, the number of slots/audio channels that are reserved for active frequency/spectrum scanning versus carrying audio payload may be configured by the MCR 101 to change over time depending on the implementation use case. For example, the above referenced MCR 101 that initially allocated audio channels 1-12 for active frequency/spectrum scanning and audio channels 13-24 for carrying audio payload might be configured to re-allocate some or all of audio channels 1-12 for carrying audio payload based on: a defined mode or system transition (e.g., completion of a calibration or setup routine), channel configuration changes determined based on active frequency/spectrum scanning, and/or channel configuration instructions determined based on changing system topologies (e.g., the addition or subtraction of microphones, transmitters, interferers, etc.). Such MCR 101 embodiments might also be configured to re-allocate channels in the opposite direction (e.g., from audio payload carrying to active frequency/spectrum scanning) to support changing system requirements or operating conditions.

Alternatively, two or more of audio channels 13-24 may be allocated for a single wireless microphone, while others of audio channels 13-24 may be allocated for one or more other wireless microphones. The MCR 101 can be configured such that a single audio channel can be allocated for more than a single wireless microphone. To accomplish this audio channel allocation flexibility, the MCR 101 can allocate audio channels to sub-bands of the frequency dimension and/or subcarriers over the time dimension, e.g., using digital multiplexing approaches such as OFDMA or the like. The MCR 101 can be configured to simultaneously carry out scanning for available spectrum while also carrying out channelization.

The MCR 101 can have a tuning range of between about 174 MHz and about 2 GHz. The MCR 101 can be configured for concurrent tuning in multiple sub-bands, e.g., 70 MHz spans, within the overall range. The MCR 101 can be compatible with other transmitters, such as ULX-D® transmitters, QLX-D® transmitters, and Axient Digital® transmitters. The MCR 101 can be configured to accommodate, flexibly, between 1 audio channel and 24 channels, or more. The MCR 101 can comprise antenna inputs, such as between one antenna input and about four antenna inputs, or more. The MCR 101 can comprise a four port Ethernet switch for split/redundant Dante audio output, a power over ethernet input, a direct circuit power module, or the like.

The MCR 101 can comprise a display for presenting network configuration and audio channel allocation information to users, facilitate configuration and metering, and the like. The MCR 101 can comprise a port, such as an infrared radiation (IR) port for linking, synching, and firmware updates. The MCR 101 can be configured to link with transmitters to assist with interference avoidance, for channel quality monitoring and metering, and the like. The MCR 101 can be configured to facilitate frequency diversity, high density channelization, and audio channel encryption.

The MCR 101 can be configured to receive and store FPGA images, raw binary file, program image, a resource utilization file, or the like, associated with different audio channel capacities, programmable logic block configurations, logical channel mappings, FPGA array schematics, IP cores, circuit arrangement schematics, or the like. The MCR 101 can be configured to select an FPGA image and/or implement a software-defined radio (SDR) function in order to cause the FPGA or processor of the MCR 101 to accommodate an appropriate number of audio channels, one or more particular audio channel types, one or more antenna configurations, one or more channel mapping/logical channelization approaches, or the like.

The MCR 101 can be configured to select a single FPGA image, or similar configurational instance, from among a larger set, in order for the FPGA of the MCR 101 to properly be properly configured/reconfigured to accommodate a desired number of audio channels, antenna diversity, bandwidth use, audio channel allocation, and/or the like. The MCR 101 can be configured to select the FPGA image or similar configurational instance based upon a digital license key or the like. The digital license key can be transmitted to and stored at the MCR 101.

When a configurational change is desired, the MCR 101 can request and/or receive a new digital license key, and based on the new digital license key, can select a different FPGA image. The new FPGA image can be implemented to reconfigure the FPGA of the MCR 101, such that the MCR 101 is then configured for a different number of audio channels, different antenna configuration, use of different range(s) of bandwidth, and/or a different audio channel allocation.

Additionally or alternatively, the MCR 101 can be configured to employ software-defined radio (SDR) elements to carry out configurational changes, such as audio channel allocation, channelization, filtering, mixing, scanning for available spectrum, modulation/demodulation, encoding/decoding, or the like.

The MCR 101 can be configured to reserve one or more slots/audio channels for scanning for available audio for purposes of interference detection/reduction, audio channel allocation improvement, channelization debottlenecking, and/or the like. To do so, the MCR 101 can designate one or more audio channels to iteratively and/or continuously search for clear frequencies, troubleshoot interference problems, identify changes in channel quality, and the like. By designating one or more audio channels for such scanning activities, the MCR 101 can designate the antenna resources, processing capacity, SDR functionality, time/spectral resources, and/or the like, associated with/mapped to the logical audio channels designed for scanning. For example, if the MCR 101 has a maximum audio channel capacity of 24 channels, 12 audio channels can be designated for active audio payload transmission, and 12 audio channels can be designated for scanning for available spectrum.

The MCR 101 can scan not only for available spectrum, but also congestion within spectral resources, quality of audio channels, availability of spectral resources for orthogonal/concurrently received/provided audio channels, and/or the like. By scanning for available spectrum in a continuous basis, non-continuous ongoing basis, or the like, the MCR 101 may be desirably configured such that it does not need to retune hardware to accomplish interference mitigation; instead, the MCR 101 can be configured to look at a broader/wider range of spectrum and retune audio channel(s) to mitigate interference without the need for a discrete scan for available spectrum. Such MCR 101 embodiments are configured to perform better than traditional systems in various performance metrics such as time-to-retune. Such MCR 101 embodiments are also configured to perform better than traditional systems because MCR 101 embodiments are configured to maintain communication with microphones or other system devices that are often dropped when traditional systems re-tune designated channels.

Based on the results of such audio scanning, the MCR 101 can be configured to surrender/occupy available resources for audio channels to decrease/increase audio channel capacity. The MCR 101 can be configured to transmit original/new audio channel allocation information and/or antenna configurational information to one or more wireless audio transmission devices, such as wireless microphones. The MCR 101 can be configured to transmit original/new audio channel allocation information and/or antenna configurational information to one or more wireless audio reception devices, such as in-ear monitors or wireless speakers.

The MCR 101 can operate in band with a number of audio channels. Thus, in such embodiments, a change of audio channels may be executed as an in-band switch or a switch over in-band resources. Since the audio data in a particular audio channel is digitized, the digital audio information and/or information about available spectrum may be provided to a frequency management node or baseband device to process and determine if other audio channels can be allocated to the available spectrum.

The MCR 101 can further comprise a system function configured to determine how best to use the available spectrum. The MCR 101 can be configured programmatically improve or optimize use the available spectrum, and cause upstream transmitters to be configured appropriately in view of such improved or optimized system configuration.

The MCR 101 and its processor and/or a microcontroller component can be configured to carry out certain software-defined radio features, such as channel linking, spares pool and receiver linking. As a wide tuning box, the MCR 101 can be configured for out-of-band filtering to reduce or eliminate noise from other persistent high power RF sources that can desensitize the radio frequency receivers of the MCR 101. This can be accomplished using a software-defined ratio feature, such as a linear filter, bandpass filter, or the like, implemented on a processor or other computing device as part of the MCR 101. Additionally or alternatively, the MCR 101 can be configured to communicate with one or more external components, one or more external computer devices configured to operate as a software-defined radio, one or more external digital signal processing equipment, and/or the like-which the MCR 101 can cause to carry out filtering or the like.

The MCR 101 can be configured to use and/or accommodate all bands and sub-bands between about 2 GHz and very-high-frequency (VHF), e.g., 174 MHz, inclusive of all values and ranges therebetween. The MCR 101 can be configured to accommodate audio channels having any suitable channel bandwidth or occupying any suitable portion of the frequency dimension. For example, the MCR 101 can be configured to use and/or accommodate audio channels having a middle frequency of about 900 MHz, or the like.

The MCR 101 can be configured to receive and demodulate audio in audio channels across a diverse set of bands/sub-bands of the frequency domain. The MCR 101 can be configured to receive and demodulate audio from multiple different transmitters that use more than one different transmission scheme or technology. For instance, the MCR 101 can be configured to receive and demodulate audio from one or more one-channel transmitters, one or more multiple-channel transmitters, one or more bodypack transmitters, one or more microphone transceivers, one or more lavalier microphone transceivers, one or more podium microphone transceivers, one or more instrument transceivers, one or more other microphones transceivers, one or more other receivers, and/or the like, some or all of which can be wireless, some or all of which can be body-worn, some or all of which can be digital, some or all of which can be analog.

The MCR 101 can exhibit reductions in antenna distribution complexity, power management requirements, and heat management requirements relative to larger receiver deployments. Without wishing to be bound by any particular theory, this can be at least because the MCR 101 can be deployed at a configuration that accommodates a smaller number of audio channels and implements scaled down hardware, fewer antennas, less or slower cooling equipment, and/or the like, while still being reconfigurable for a larger number of audio channels selectively, as needed.

The MCR 101 can additionally or alternatively be configured to tune to (or listen for) more than one different sub-band or frequency range within an overall range of about 2 GHz and about 174 MHz, or the like. For example, the MCR 101 can be configured to be concurrently tuned in to two or more 70 MHz frequency spans within the overall frequency range.

The MCR 101 can additionally or alternatively be configured for communication across up to 24 channels with certain digital wireless transmitters, such as Shure ULX-DR transmitters and Shure QLX-DR transmitters. The MCR 101 can additionally or alternatively be configured for communication across up to 16 channels with certain other digital wireless transmitters, such as Shure Axient Digital® transmitters. As noted above, the MCR 101 can include a larger FPGA, in which case the MCR 101 may additionally or alternatively be configured for communication across up to 25 channels, 30 channels, 35 channels, 40 channels, or more.

The MCR 101 can additionally or alternatively comprise a plurality of antenna inputs, such as two, three, four, or more. The MCR 101 can additionally or alternatively comprise a plurality of outputs, such as ports, port ethernet switches, split/redundant Dante audio outputs, other audio transport modes, and/or the like. The MCR 101 can additionally or alternatively comprise one or more Power-over-Ethernet (POE) ports, such as PoEs that are configured for powering the MCR 101 and/or other hardware. The MCR

101 can additionally or alternatively comprise one or more direct current (DC) power modules. The MCR 101 can additionally or alternatively comprise one or more displays for displaying MCR settings information, channel configuration information, channel use metering information, channel license information, and/or the like.

The MCR 101 can additionally or alternatively be configured for headphone monitoring with Dante Browse™. The Dante Browse™ feature can allow for headphone monitoring of audio from any Dante-enabled device in the audio system. The MCR 101 can additionally or alternatively be configured to be designated as a cue station according to the Dante Cue™ feature, such that the designed cue station receiver is configured as a listening station for monitoring audio from other audio devices in the audio system.

The MCR 101 can additionally or alternatively be configured for linking with external computing systems, cloud computing devices, external networks or access points, and/or the like. The MCR 101 can be configured to sync with one or more other MCRs, one or more other audio system devices, a central access point, and/or the like. The MCR 101 can be configured to connect wirelessly to any suitable network, server, computing device, access point, tower, and/or the like, such as to accomplish firmware updates, send and receive updated licenses and license terms, send and receive additional licenses for additional audio channels, and/or the like. This can be carried out via infrared radiation (IR) port, wirelessly via any suitable telecommunications or radio signaling protocol, and/or the like.

The MCR 101 can be configured to at least partially control linked transmitters remotely. The MCR 101 can be configured for continuous, on-demand, ad hoc or other such transmitter linking arrangements. The MCR 101 can be configured to avoid interference with likely linked and likely nearby audio system hardware, such as other transceivers, audio mixing equipment, wireless audio devices (both upstream and downstream of the MCR 101), and/or the like. The MCR 101 can be configured to carry out channel quality metering for one or more of the plurality of audio channels it is configured to accommodate according to the current license terms. For example, the MCR 101 can measure or receive information related to bit error rate, audio payload packet loss, and/or the like. The MCR 101 can be configured for talk switch output routing, frequency diversity, high density audio channel allocation, encryption of audio channels, receiving and decrypting encrypted audio channels, and/or the like.

The MCR 101 can be configured for tuning of multiple antennas to a single audio channel. Without wishing to be bound by any particular theory, a dual or quad MCR may exhibit high-performance RF and transparent digital audio that are configured for software control. The MCR 101 can assign more than one antenna (e.g., two, four, or more antennas) to a single channel to facilitate greater coverage and signal quality. The hardware configuration and architecture that enables assignment of multiple antennas to a single audio channel can be described as a Quadversity™ mode.

The Quadversity™ mode can be automatically activated by the MCR 101, such as in instances in which the MCR 101 is programmed for lower channel capacity and has excess antennas that can be assigned for a single audio channel. Said otherwise, the MCR 101 might be configured for only 16 channels and the software-defined radio components or processor/microcontroller of the MCR 101 can determine that certain antennas would otherwise be inactive, and can activate the Quadversity™ mode for one or more high-priority audio channels to improve coverage and signal quality by assigning multiple antenna to a single audio channel. Examples of receivers other hardware, and associated methods, for increasing channel flexibility are described in further detail in commonly owned U.S. Pat. Nos. 9,667,285, 9,793,936, 10,069,525, 10,230,412, 10,615, 828, and 10,720,953, the entire disclosures of each of which are hereby incorporated herein by reference in their entireties for all purposes.

The MCR 101 can be networked with other MCRs and/or other audio devices to facilitate audio channel decryption, demodulation, decoding, and/or the like. Operating modes of the MCR 101 may be constrained by modulation scheme rather than by audio channel availability. For example, when the MCR 101 is implemented in a Axient Digital® operating mode, the MCR 101 may be configured for a lesser max channel count (e.g., 16) than other operating modes such as a ULX-D operating mode (which may be configured for, e.g., a max channel count of 24).

The MCR 101 can be configured to demodulate two or more concurrent 70 MHz spans within its overall tuning range, with, for example, a first 70 MHz span allocated to cover some or all of the ULX-D transmitter bands and the two adjacent 70 MHz spans allocated to cover some or all of the ULX-D transmitter bands. In an instance in which both 70 MHz spans overlap, the MCR 101 may be supported for a Quadversity™ mode. Quadversity™ mode may function using an overlap between two adjacent 70 MHz spans. The Quadversity™ mode and associated hardware and methods are further described in commonly owned U.S. Pat. No. 10,720,953 and U.S. Patent Publication No. 2022/0021410 A1, the entire disclosures of each of which are hereby incorporated herein by reference in their entireties for all purposes.

Some of the advantages of various MCR embodiments described herein can include:

a reduction in the size and storage costs of wireless digital audio system hardware, a reduction in the weight and transportation costs of wireless digital audio system hardware, a reduction in the heat generated and the power consumed by wireless digital audio system hardware, increased simplification of antenna systems for high channel count wireless audio systems, increased flexibility for variable channel count implementations, increased versatility of the audio system to accommodate diverse spectrum environments and changing spectral resource availability, increased channel density and channel diversity, increased interoperability with different transmitters, improved performance and spectrum optimization based on dynamic spectrum scanning and channelization through allocating specific channels for frequency scanning and others for carrying audio payload, increased flexibility for receiving audio payload according to a variety of different wireless audio modulation and transmission protocols.

The MCR 101 can be configured to accommodate or listen for a plurality of channels, such as audio channels. In the system 100 of FIG. 1A, the MCR 101 is configured based upon current configurational inputs such as license terms, authentication keys, or the like, to accommodate or listen for up to eight audio channels. In the system 100 of FIG. 1B, the MCR 101 is configured based upon current configurational inputs to accommodate or listen for up to 16 audio channels. In the system 100 of FIG. 1C, the MCR 101 is configured based upon current configurational inputs to accommodate or listen for up to 24 audio channels. In the system 100 of FIG. 1D, the MCR 101 is configured based upon current configurational inputs to accommodate or listen for up to eight audio channels. In the system 100 of FIG. 1E, the MCR 101 is configured based upon current configurational inputs to accommodate or listen for up to 16 audio channels.

The MCR 101 can be configured to receive digital and/or analog audio signals. The MCR 101 can be configured to receive signals comprising audio payload, synchronization information, beacon symbols, pilot tones, and/or the like. Audio payload information can be organized in radio frames carrying subcarriers allocated to different audio channels mapped across one or more sub-bands of the frequency domain. Examples of several of the suitable audio transmissions that the MCR 101 can be configured to receive and various encoding, modulation, encryption, scrambling, and allocation schemes are described in commonly owned U.S. Pat. Nos. 8,755,447, 9,667,285, 9,793,936, 10,069,525, 10,134,412, 10,230,412, 10,615,828, 10,944,535 and U.S. Patent Publication Nos. 2020/0059400 A1, 2021/0274331 A1, 2021/0141590 A1, and 2022/0029678 A1, the entire disclosures of which are hereby incorporated herein by reference in their entireties for all purposes.

The network switch 102 can be configured to receive packets from the MCR 101 via packet switching, the packets comprising audio payload information. The network switch 102 can be configured to provide audio payload packets to the MCR 101 for a plurality of different audio channels, in series or in parallel. The network switch 102 can be or can comprise a multilayer switch, stackable switches, standalone switches, rack-mounted switches, an access point, a communications tower, a baseband device, and/or the like. The network switch 102 can be or can comprise an unmanaged switch, a managed switch, a smart switch, an adaptive switch, a network-managed switch, an enterprise managed switch, and/or the like. Other configurations, implementations, embodiments, and options for a suitable network switch will be readily apparent to a person having ordinary skill in the relevant art.

The network switch 102 can be configured to organize, orient, route, or otherwise transmit packets, such as audio payload packets, to the audio console 103. The audio console 103 can be or comprise a mixing board or the like. The audio console 103 can be configured to receive the audio payload packets from the network switch 102 and mix mono and stereo mixes. The audio console 103 can be configured to filter, sum, adjust, modify, equalize, record, transmit, or otherwise produce finished audio content based on the audio payload packets received from the network switch 102. Other configurations, implementations, embodiments, and options for a suitable audio console will be readily apparent to a person having ordinary skill in the relevant art. For example, the MCR 101 can include or be configured to communicate with one or more breakout boxes that are configured to convert the MCR audio network output (e.g., Dante or otherwise) to other formats, such as analog, other digital schemes, or the like.

Figure 3:
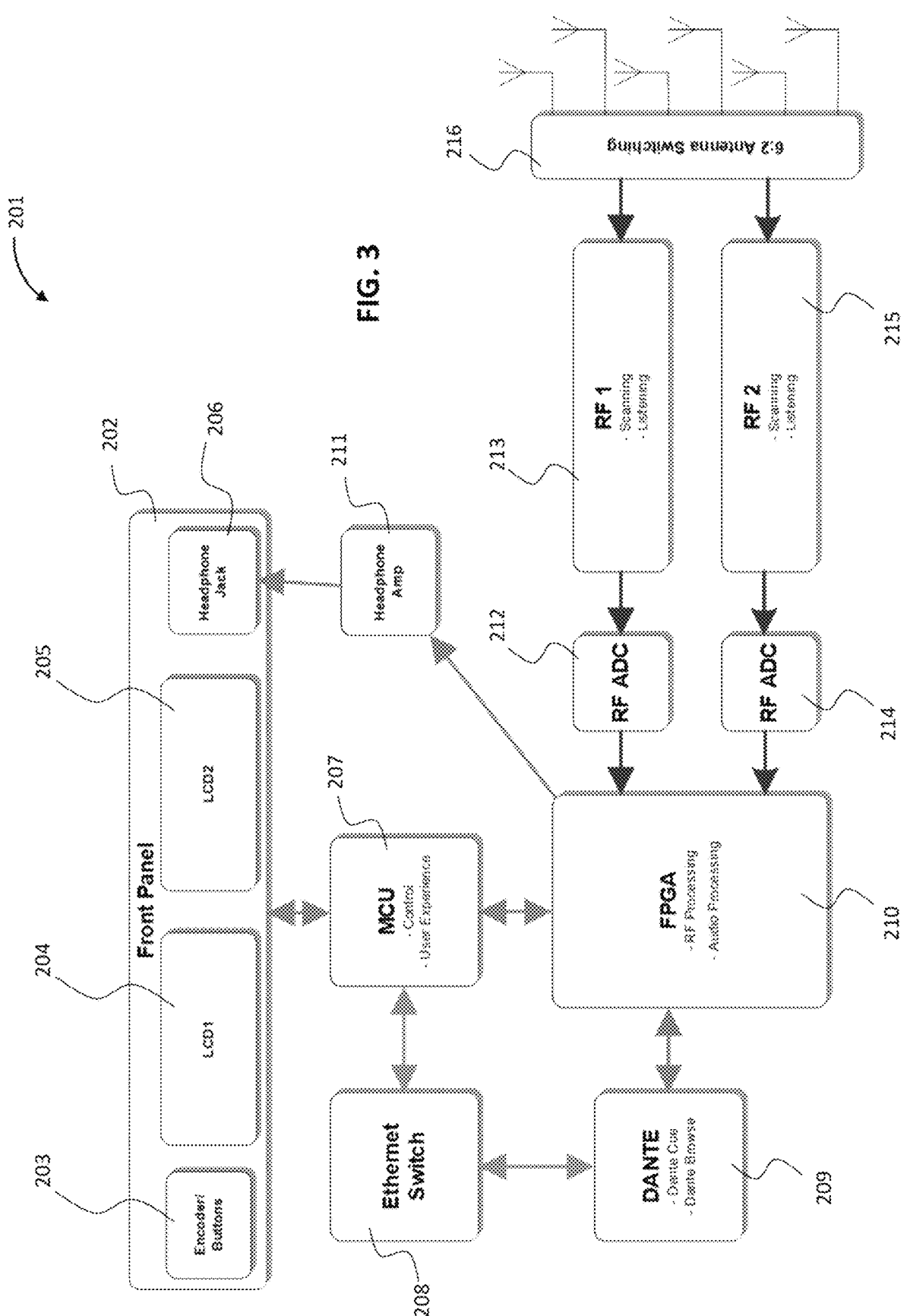
FIG. 3 is a schematic diagram of an audio transceiver, according to an embodiment.

FIG. 3 illustrates an MCR 201 that is configurable for different audio channel capacities and which can be reconfigured remotely based upon changes in digital license key terms. The MCR 201 can be similar to or the same as MCR 101, and is illustrated in more detail with regard to its user interface, subcomponent communication, and audio output. The MCR 201 can comprise a front panel 202, the front panel 202 comprising encoder buttons 203, one or more displays 204, 205, and an optional headphone jack 206. The MCR 201 can further comprise a microprocessor (MCU) or a processor 207 configured for input/output control and user experience. The processor 207 of the MCR 201 can be configured to carry out scanning for available spectrum, evaluation of spectrum/audio channel quality or interferers, initial assignment/allocation of audio channels to available spectrum, re-assignment/reallocation of audio channels to other portions of the spectrum, and/or the like, such as described herein regarding the MCR 101 illustrated in FIGS. 1A-2. The MCR 201 can further comprise an ethernet switch 208 in operable communication with the processor 207. The MCR 201 can further comprise a Dante 209 configured to transmit uncompressed, multi-channel, low-latency digital audio within and out of the MCR 201.

The MCR 201 can further comprise a field programmable gate array (FPGA) 210 configured for radio frequency signal processing and digital audio processing. The FPGA 210 can be static or flexible, can comprise memory blocks that are flexible, and/or can be re-programmable for different logic tasks, receiver configurations, receiver architectures, channel configurations, and/or the like. The FPGA 210 can be part of or in communication with an application specific integrated circuits (ASIC). The FPGA 210 can be implemented as a system-on-a-chip (SOC) ASIC. FPGAs and ASICs can be used to implement discrete time processing of an input signal in wireless audio equipment, such as the MCR 201. The FPGA 210 can be similar to the FPGAs described in further detail in commonly owned U.S. Pat. No. 8,755,447, the entire disclosure of which is hereby incorporated herein by reference in its entirety for all purposes.

The FPGA 210 can be in communication with and/or controlled by the processor 207. The FPGA 210 can be in further communication with the optional headphone jack 206 in order to transmit processed, uncompressed, unfiltered, unmixed audio from one or more select channels to headphones when the headphones are plugged into the MCR 201 at the headphone jack 206.

The MCR 201 can further comprise analog-to-digital converters (ADCs) 212, 214 configured to convert analog radio frequency signals carrying digital audio payload information received from radio frequency receivers 213, 215. The radio frequency receivers 213, 215 can be configured to control an antenna array 216 in order to scan for and/or listen for radio frequency signals carrying audio payload information via a number of different audio channels. An antenna switching ratio of 6:2 or any other suitable ratio of antenna to radio frequency receiver can be used. The processor 207 and/or the FPGA 210 can be configured to control the radio frequency controllers 213, 215 and/or the antenna array 216.

Figure 4:
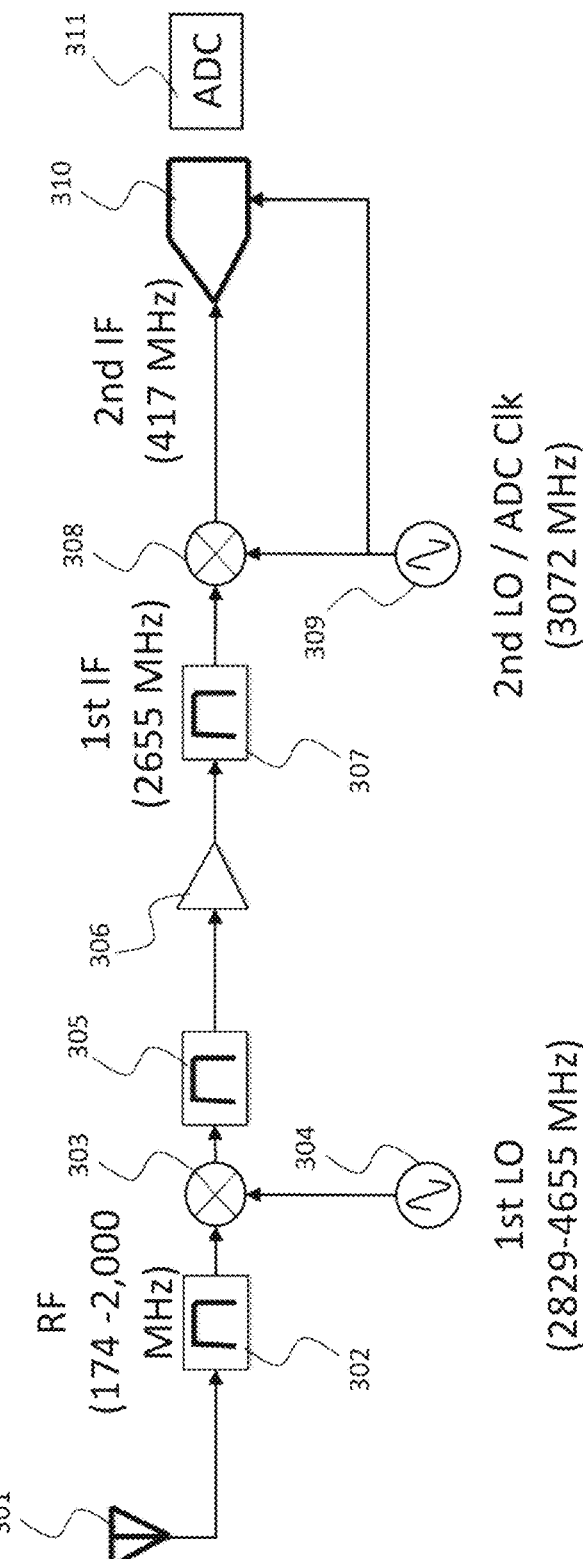
FIG. 4 is a schematic illustration of a dual conversion radio frequency architecture, according to an embodiment.

FIG. 4 illustrates a dual conversion architecture 300 that can be used for digital signal processing (e.g., demodulation and frequency synchronization) of digital audio information when using a wideband receiver, such as the MCR 201 or the MCR 101. According to the dual conversion architecture 300, audio signals are received at an antenna 301 and filtered 302 for a subrange of, e.g., 172 MHz to 2 GHz. A frequency mixer 303 module then mixes incoming radio frequency signal from the antenna 301 with a signal from a local oscillator (LO) 304 to produce a lower fixed frequency signal. This lower fixed frequency signal is then sampled 305 again for the same subrange and amplified 306 to form a first intermediate frequency (IF) signal having a bandwidth of about 2,655 MHz. The first IF signal is then sampled 307 again.

The first IF signal is then frequency mixed 308 again with a fixed frequency signal from a LO/ADC clock (CLK) 309, the fixed frequency signal having a frequency of about 3,072 MHz, to form a second IF signal having a frequency of about 417 MHz. The second IF signal is then amplified 310 and provided to the ADC 311 for analog-to-digital conversion. Without wishing to be bound by any particular theory, this dual conversion architecture 300 may provide for improved frequency planning for wideband receivers.

The MCR can be a heterodyne or superheterodyne receiver that uses one or more variable frequency oscillators, one or more mixers, and one or more filters to convert the raw signal to the IF signal, or a baseband. The ADC 311 can then sample this IF or baseband signal. It may not be necessary to convert the raw signal to IF or baseband signal, and instead the ADC 311 may sample the raw audio signal directly or after simple amplification.

Frequency mixers, LO, IF amplifiers, LO/ADC clocks, and ADC/DAC modules are described in more detail in commonly owned U.S. Pat. Nos. 8,755,447, 9,667,285, 9,793,936, 10,069,525, 10,230,412, and 10,615,828, the entire disclosures of each of which are hereby incorporated herein by reference in their entireties for all purposes.

Figures 5, 6:
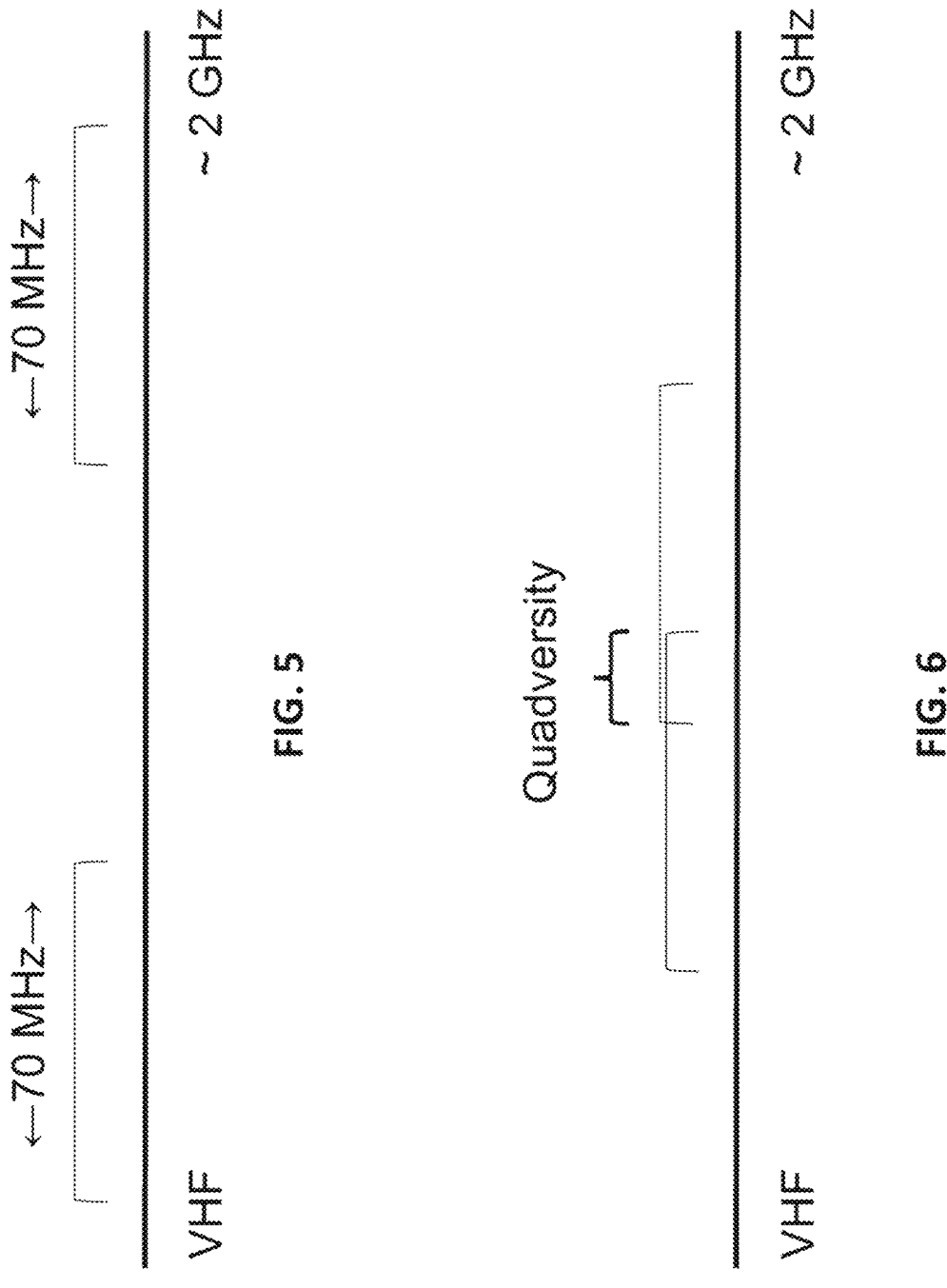
FIG. 5 is a schematic illustration of band splits for a software-defined radio transceiver, according to an embodiment.
FIG. 6 is a schematic illustration of band splits for a versatile, high-end software-defined radio transceiver, according to an embodiment.

FIGS. 4 and 5 each illustrate a portion of the frequency domain of an audio signal with two 70 MHz slots identified within the portion of the frequency domain. In FIG. 5, the two slots are non-overlapping, which allows for dual channel configuration but not the Quadversity™ mode. However, in FIG. 6, the two slots are overlapping, which allows for the Quadversity™ mode. The use of Quadversity Mode™ can allow for the arrangement of distributed antennas and the establishment of different zones by combining the signal from four antennas to increase signal strength and extend coverage. By combining the signal and increasing signal strength in Quadversity Mode™, the combined signal is able to overcome a typical noise floor, improve signal quality received at the antennas from transmitters, and reduce signal loss, signal distortion, and/or the like. When in Quadversity Mode™, the channel count accommodated by the receiver may be reduced, e.g., by half. For instance, a four channel receiver may be reconfigured as a two channel receiver when placed in Quadversity Mode™.

Figure 7:
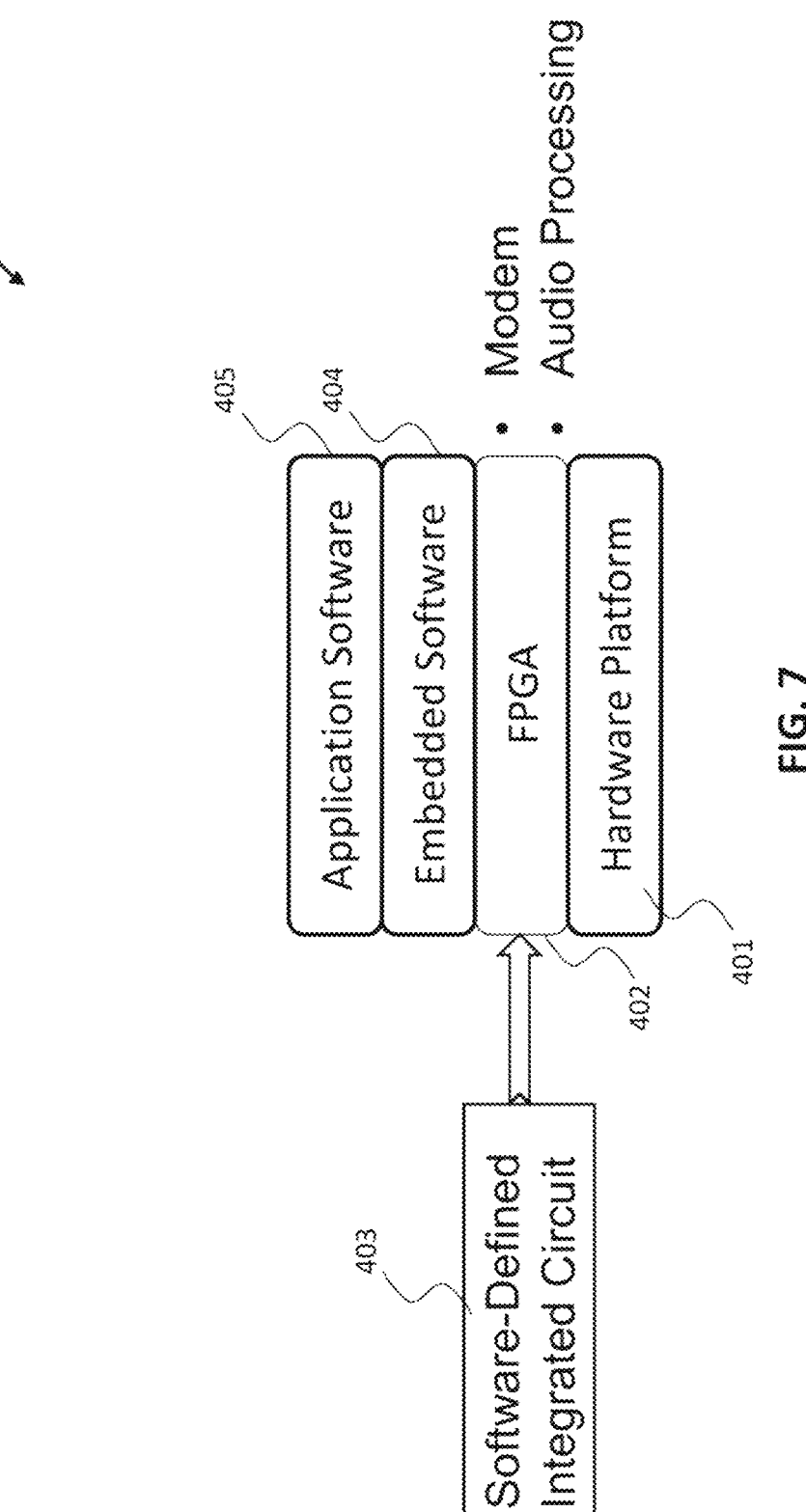
FIG. 7 is a schematic illustration of a software defined radio hardware platform for audio systems, according to an embodiment.

FIG. 7 illustrates an SDR implementation 400 for an MCR, e.g., the MCR 101 or the MCR 201. The SDR implementation 400 illustrated can be used for digital signal processing, channel capacity changes, antenna assignment, or the like. The SDR implementation 400 can include a hardware platform 401 that comprises, for example, a microprocessor, antenna array, radio receiver, and/or the like. The SDR implementation 400 can further include an FPGA 402. The SDR implementation 400 can further include a software-defined integrated circuit (SDIC) 403 in communication with or integrated into the FPGA 402. The SDIC 403 can be implemented and/or reconfigured by embedded software 404, e.g., according to instructions, signals, commands, or the like provided by a user, e.g., via user interaction with application software 405.

The FPGA 402 can be configured to act as a modem for inter- or intra-network communications, such as for receiving/confirming licensing information, firmware/software updates, user authentication, decryption assistance, and/or the like. The FPGA 402 can further be configured to facilitate audio processing, such as by phase shifting/correction, denoising, demodulation, phase offset correction, timing offset correction, coarse/fine carrier offset correction, frequency offset correction, pilot-aided synchronization, and/or the like.

The FPGA 402 can be configured to communicate with a remote computing device or network element, such as a server, a cloud computing device, an access point, and/or the like. A user portal may be provided for users to create and manage accounts, register specific hardware or subcomponents by serial number, purchase upgrades, purchase channel upgrade licenses, and/or the like. The user portal may be in communication with the remote computing device or network element such that when a user purchases, for example, a new license to increase the available audio channels for their MCR from 16 to 24 channels, or the like, the remote computing device or network element can provide reconfiguration instructions to the MCR (e.g., 101) associated with the user.

A digital license key may be purchased by a user at the user portal or otherwise. The digital license key can be a Node-locked licensing process for the hardware, unlocking persistent capabilities that are purchased on the user portal, e.g., without the need for internet or IOT connectivity. From the user perspective, enabling the license to be upgraded via the user portal and reconfiguration of the MCR hardware to occur automatically in the background means that the reconfiguration and up- or down-scaling of the MCR channel capacity is less involved than a typical firmware update.

MCR devices as configured herein can enable a user to manage link relationships for up to 24 transmitters to a single device. In the case of Axient Digital® implementations for example, spare transmitters can be linked to each channel. Linking and synching spare transmitters typically employ complex system interactions and ask users to align IR ports of the components, or otherwise manually associate the various transmitters. Also, different functionality is provided by different transmitters and transmitter technologies, which means that the scalability of many receivers is constrained by the complexity and non-interoperability of specific different types of transmitters implemented and the specifics of the receiver(s) used.

MCR embodiments discussed herein are configured to support many different transmitter types, which could lead to increased complexity and an increased number of corner/edge cases that need to be facilitated. To reduce the time, effort and frustration involved with configuring an MCR, users can sync and move registered transmitters via software only, e.g., by way of the SDIC 403.

The often time-consuming and error prone workflow of updating transmitter firmware via IR ports is a well-known and documented usability problem. An advantage of various MCR embodiments discussed herein is that such embodiments accommodate batch processing of transmitter firmware updates, which eliminate the need to maintain each transmitter in close proximity to an IR port of the receiver for minutes at a time, and often in series. Such a batchwise process for transmitter firmware update processing can be accomplished via a single IR port on various MCR embodiments.

Various approaches for carrying out over-the-air (OTA) receiver and/or transmitter updates, are described in more detail in commonly owned U.S. Patent Publication No. 2020/0059400, the entire disclosure of which is hereby incorporated herein by reference in its entirety. The MCR can be configured to carry out such an OTA firmware update for a plurality of transmitters, such as those associated with wireless microphones. The MCR can also be configured to receive OTA firmware updates, digital license keys, and/or the like from another component of the audio system, such as an access point, a baseband controller, or the like.

Also, in order to increase the amount of analytics data collected from the use of software applications at the transmitters and/or receivers, the MCR can be configured to capture many key data points from the hardware itself. The MCR may have an increased capacity to store a digital license generated through an online transaction. The MCR might not be used as an IoT device and might not have a direct internet connection in certain use environments. In other embodiments, the MCR may be an IoT device and/or may have a direct internet connection for purposes of receiving digital license keys, firmware updates, user authentication, etc. The MCR can be configured for collecting, storing, and uploading usage data to a software ecosystem, server, and/or the like.

Figure 8:
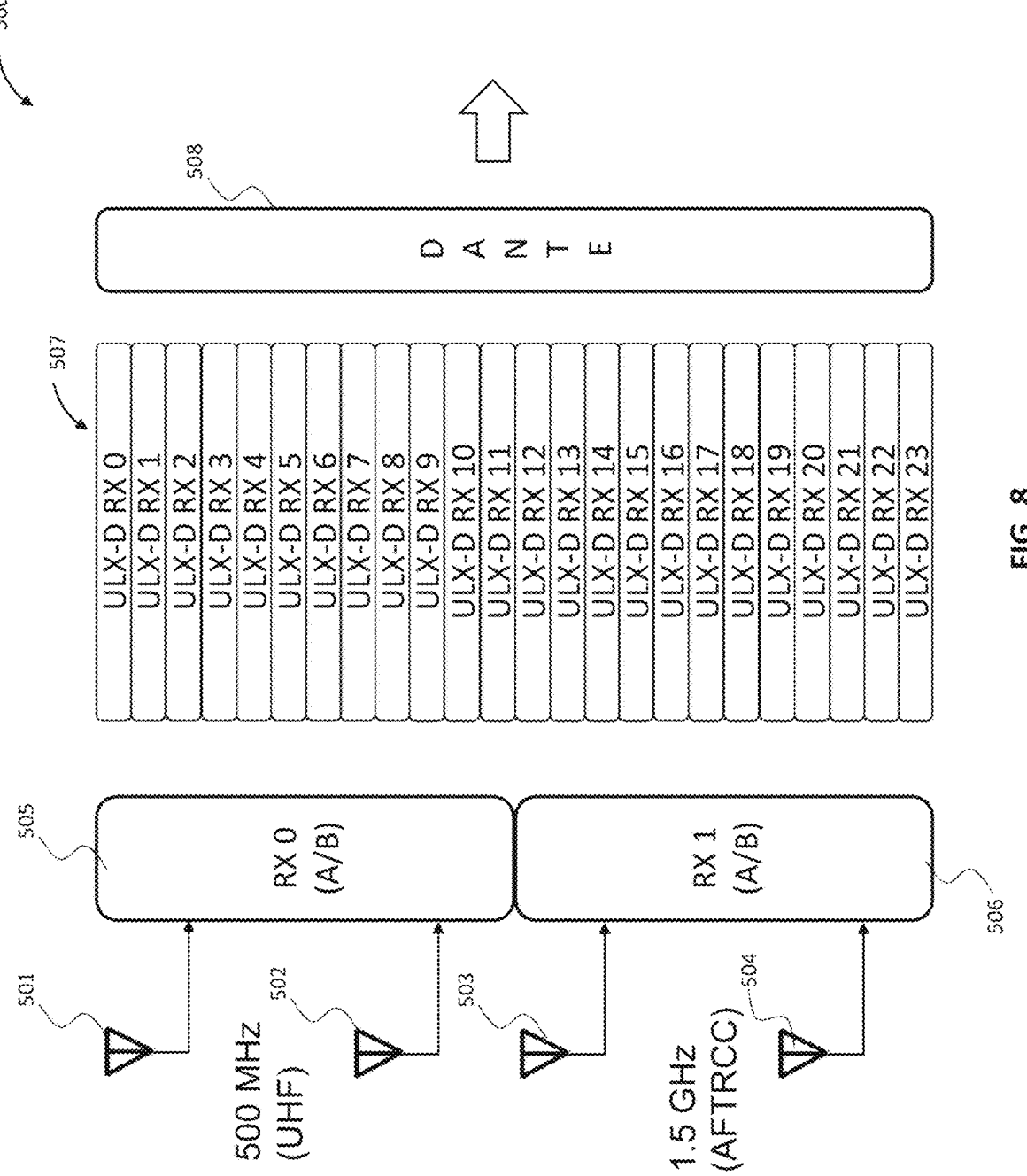
FIG. 8 is a schematic illustration of a channel and antenna arrangement for a transceiver, according to an embodiment.

FIG. 8 illustrates an embodiment of the MCR in which a single MCR 500 is configured to accommodate up to 24 audio channels. The MCR 500 can comprise a plurality of antennas 501, 502, 503, 504. Antennas 501 and 502 can be configured for receiving UHF transmissions, such as those having a frequency of about 500 MHz. Antennas 503 and 504 can be configured for receiving AFTRCC transmissions, such as those having a frequency of about 1.5 GHZ. Other antennas can be included and/or one or more of antennas 501-504 can be allocated for and configured to receive transmissions other than those described.

The MCR 500 may also include receivers 505 and 506 that are configured to control, configure, and receive signals from antennas 501, 502, 503, 504. The receivers 505 and 506 can be configured to receive signals from antennas 501, 502, 503, and/or 504 that comprise raw audio information. The receivers 505 and 506 or a microprocessor or the like can then be configured to listen for particular sub-portions of the received signal known to be allocated to particular audio channels and to sample the audio signal(s) for these sub-portions of the audio signal. The audio channels, which can include up to 24 distinct audio channels, can then be filtered, frequency/time synchronized, demodulated, and decoded. The decoded audio can then, optionally, be converted to digital audio information. The decoded audio or digital audio information can then be output via Dante audio output, an output port, an ethernet port, or the like.

The digital audio signals output by the MCR 500, including the combined digital audio signal, may conform to the Audio Engineering Society AES3 standard, Dante standard, and/or AVB/AVNU standard for transmitting audio over Ethernet, for example. Moreover, the MCR 500 may output the digital audio signals on an XLR connector output, on an Ethernet port, or on other suitable types of outputs. The analog audio signals may be output by the MCR 500 on an XLR connector output, a ¼" audio output, and/or other suitable types of outputs.

The MCR 500 may be rack mountable, and may include a display for displaying various information, full audio meters, and RF signal strength indicators, and may further include control switches, buttons, and the like for user control and setting of configuration options. The MCR 500 may include one or more RF ports (not shown). RF ports can be BNC, SMA (SubMiniature version A) coaxial connectors, N-type, or other suitable connectors for connecting to external antennas and/or cabling.

Figure 9:
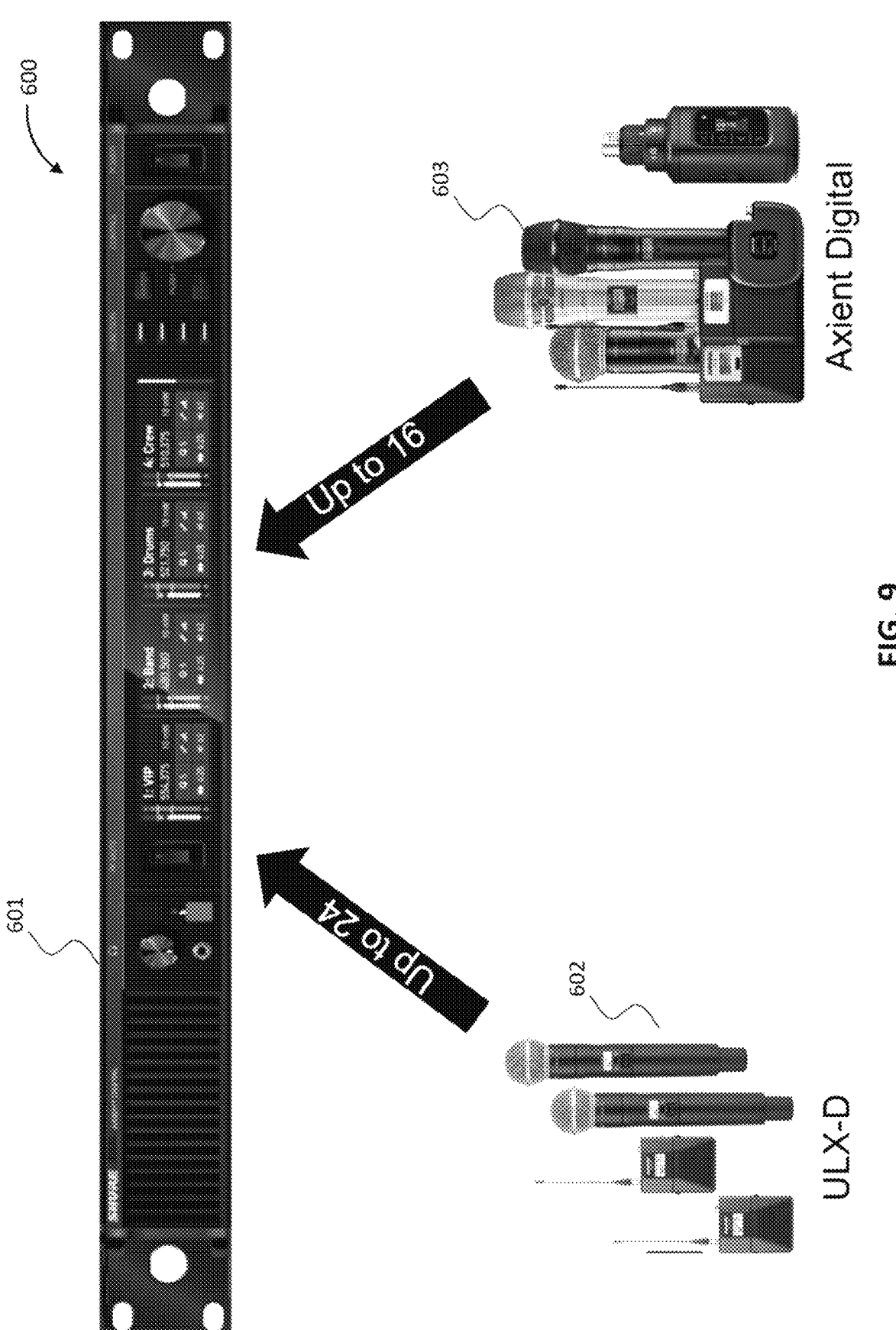
FIG. 9 is a schematic diagram of an audio system comprising a software-defined radio transceiver, according to an embodiment.

FIG. 9 illustrates an audio system comprising an MCR 601 configured to selectively be in wireless communication with one of a first set of audio devices 602 (e.g., one or more wireless audio transmitters, as discussed below) and/or a second set of audio devices 603 (e.g., one or more wireless audio transmitters, as discussed below). The MCR 601 can be similar in part or in full to the MCR 101 described above.

The MCR 601 can comprise a processor configured to operate one or more software defined radio functions, a memory in operable communication with the processor, the memory storing program code, and an integrated circuit (IC) in operable communication with the processor.

The first set of audio devices 602 can include, for example, wireless microphones and respective body-worn transmitters such as audio devices from among the Shure ULX-DR group of technologies. The second set of audio devices 603 can include, for example, wireless microphones and respective body-worn transmitters such as audio devices from among the Shure Axient Digital® group of technologies. In the event that the MCR 601 is configured for wireless communication with the first set of audio devices 602, the MCR 601 may be configured to accommodate up to 24 audio channels based on limitations at the transmitter-side that are specific to the first set of audio devices 602. In the event that the MCR 601 is configured for wireless communication with the second set of audio devices 603, the MCR 601 may be configured to accommodate up to 16 audio channels based on the limitations at the transmitter-side that are specific to the second set of audio devices 603.

The memory and the program code of the MCR 601 can be configured, with the processor and the IC, to cause the MCR 601 to scan for available spectrum, such as by using a portion of total configurable audio channels, a portion of audio channelization resources, a portion of one or more resources (e.g., antenna time and/or directionality, antenna resource use, logical channel mapping, audio channel transmission scheduling, etc.), for scanning. The scanning can be carried out in-band/intra-band within a particular sub-band (e.g., a 70 MHz sub-band) of spectrum, and/or can be carried out cross-band/inter-band between different sub-bands (e.g., between different 70 MHz sub-bands) of spectrum. The MCR 601 can determine antenna configuration(s), audio channel number, channelization characteristics, audio channel allocation, transmission mode(s), or the like, based on said scanning for available spectrum.

The MCR 601 can, for example, cause the IC to map audio channels according to a new allocation schema, or reconfigure an antenna/antenna array for the MCR 601 based on the available spectrum scan. The spectrum scan can also or alternatively be a spectral quality/transmission quality scan, which may lead the MCR 601 to be reconfigured for channel quality reasons, interference reduction reasons, or the like, whether or not there are spectrum availability concerns.

Figure 10:
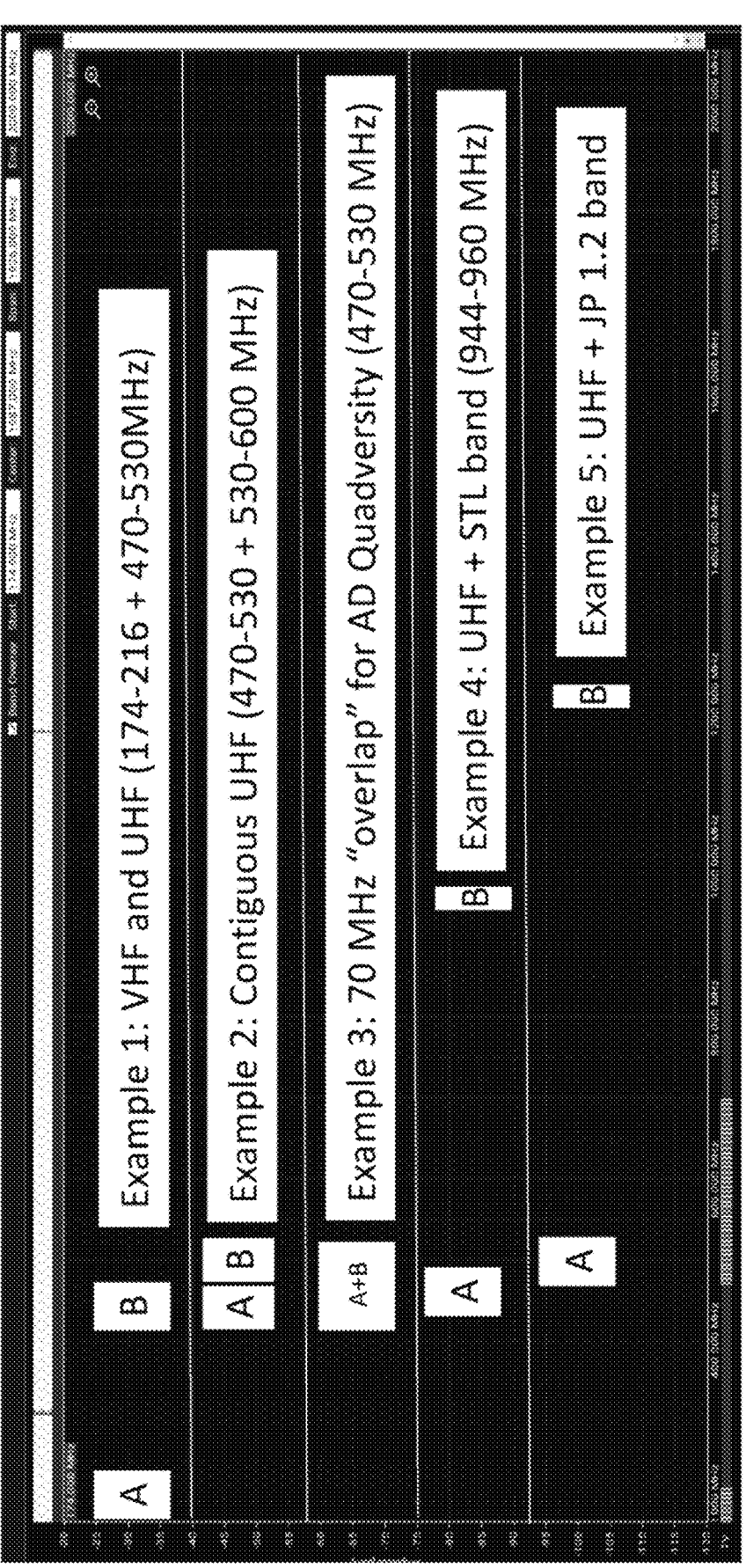
FIG. 10 is an illustration of tuning ranges for various example software-defined radio audio transceivers, according to various embodiments.

FIG. 10 illustrates example tuning ranges for several different example MCR implementations in which the MCR is configured to receive VHF, UHF, STL band, JP 1.2 band, and other bands of the available spectral resources. As can be seen in examples 1, 4, and 5, the mix of technologies and required/desired frequency bands can lead to a non-overlap between dedicated slots for the different audio channels and transmitter technologies. However, as can be seen in examples 2 and 3, certain other mixes of technologies and required/desired frequency bands can lead to overlap of dedicated slots. In the case of examples 2 and 3, for example, the MCR may be configured to implement Quadversity Mode™, which can lead to greater channel density and spectral efficiency due to the overlap.

ADDITIONAL EMBODIMENTS

The provided description, illustrations, and hardware/ circuit diagrams are provided merely as illustrative examples and are not intended to require or imply that the steps of the various embodiments must each or all be performed and/or should be performed in the order presented or described. As will be appreciated by one of skill in the art, the order of steps in some or all of the embodiments described may be performed in any order. Words such as "thereafter," "then," "next," etc. are not intended to limit the order of the steps; these words are simply used to guide the reader through the description of the methods. Further, any reference to claim elements in the singular, for example, using the articles "a," "an," or "the" is not to be construed as limiting the element to the singular.

The term "comprising" means including, but not limited to, and should be interpreted in the manner it is typically used in the patent context.

As used herein, the term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media include, for example, cables, wires, and carrier waves that travel through space without wires or cables, such as radio, optical and infrared waves. Signals include man-made transient variations in amplitude, frequency, phase, polarization or other physical properties transmitted through the transmission media. Examples of non-transitory computer-readable media include a floppy disk, a flexible disk, hard disk, any other non-transitory magnetic, optical, or physical storage media, a random access memory (RAM), a programmable read only memory (PROM), an erasable programmable read only memory (EPROM), a FLASH-EPROM, any other memory chip or cartridge, a carrier wave, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

As used herein, the terms "memory," "memory medium," and "storage medium" may refer to any of various types of non-transitory memory devices or storage devices, and are intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc.

As used herein, the term "programmable hardware element" may refer to various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

As used herein, the terms "channel" and "audio channel" may refer to a medium used to convey information from a sender (transmitter) to a transceiver. It should be noted that since characteristics of the term "channel" may differ according to different standards or protocols, the term "channel" as used herein may be considered as being used in a manner that is consistent with the standard of the type of device with reference to which the term is used. In some standards, channel widths may be variable (e.g., depending on device capability, band conditions, etc.). Certain protocols and standards may include different definitions of channels. Furthermore, some standards may define and use multiple types of channels, e.g., different channels for uplink or downlink and/or different channels for different uses such as data, control information, etc.

As used herein, the term "band" has the full breadth of its ordinary meaning, and at least includes a section of spectrum (e.g., radio frequency spectrum) in which channels are used or set aside for the same purpose.

As used herein, the term "automatically" refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

As used herein, the terms "computing device," "processor and memory," "processor," and "computer," refer to specialized, centralized devices, networks, or systems, comprising at least a processor and a memory device including computer program code, and configured to configure and reconfigure the MCR (e.g., 101, 201), cause the MCR (e.g., 101, 201) to adopt various antenna diversity modes or frequency/channel diversity modes, operate various SDR functionalities of the MCR, receive and/or transmit transmissions upstream or downstream, and/or the like.

As used herein, the terms "about," "substantially," and "approximately" generally mean plus or minus 10% of the value stated, e.g., "about 250 μm" would include 225 μm to 275 μm; "about 20 milliseconds (ms)" would include 18 ms to 22 ms; and "about 100 kbps" would include 90 kbps to 110 kbps.

As described herein and defined by the International Telecommunication Union, a "low frequency" signal or carrier wave may refer to a signal or carrier wave having a frequency between 30 kHz and 300 kHz, a "medium frequency" signal or carrier wave may refer to a signal or carrier wave having a frequency between 300 kHz and 3 MHz, a "high frequency" signal or carrier wave may refer to a signal or carrier wave having a frequency between 3 MHz and 30 MHz, a "very high frequency" signal or carrier wave may refer to a signal or carrier wave having a frequency between 30 MHz and 300 MHz, and a "ultra-high frequency" signal or carrier wave may refer to a signal or carrier wave having a frequency between 300 MHz.

Hereinafter, various characteristics will be highlighted in a set of numbered clauses or paragraphs. These characteristics are not to be interpreted as being limiting on the invention or inventive concept, but are provided merely as a highlighting of some characteristics as described herein, without suggesting a particular order of importance or relevancy of such characteristics.

Clause 1. An audio system comprising one or more wireless audio transmitters configured to transmit audio data; and one or more antennas configured to receive the audio data transmitted by the one or more wireless audio transmitters; and a multi-channel receiver (MCR) configured to receive the audio data from the one or more antennas.

Clause 2. The audio system of Clause 1, wherein the MCR comprises a processor configured to operate one or more software defined radio functions; a memory in operable communication with the processor, the memory storing program code; and an integrated circuit (IC) in operable communication with the processor, wherein the memory and the program code are configured, with the processor and the IC, to cause the MCR to at least: cause at least a portion of a plurality of audio channels to scan, using at least one of the one or more antennas, for available spectrum; determine one or more of: an antenna configuration, a transmission mode, an audio channel allocation, or a number of audio channels to be accommodated by the MCR to improve use of the available spectrum; and provide configurational information, using the processor, to the IC such that the IC can cause configuration or reconfiguration of at least one of the antennas based on the antenna configuration, transmission mode, or the number of audio channels to be accommodated by the MCR.

Clause 3. The audio system of any of Clauses 1-2, further comprising a network switch in wireless communication with the MCR, wherein the memory and the program code of the MCR are further configured, with the processor and the IC, to cause the MCR to at least: transmit information about the available spectrum to a network switch; and receive, from the network switch, in response to transmitting the information about the available spectrum, the configurational information, and wherein the network switch is configured to at least: receive, from the MCR, the information about available spectrum; generate the configurational information; and transmit, to the MCR, the configurational information.

Clause 4. The audio system of any of Clauses 1-3, wherein the scan for the available spectrum is carried out by only a portion of the one or more antennas.

Clause 5. The audio system of any of Clauses 1-4, wherein the scan for the available spectrum is carried out within a particular sub-band previously assigned to the MCR.

Clause 6. The audio system of any of Clauses 1-5, wherein the memory and the program code of the MCR are further configured, with the processor and the IC, to cause the MCR to at least: determine, based at least on the available spectrum and current audio channel allocation information, the configurational information.

Clause 7. The audio system of any of Clauses 1-6, wherein the MCR is configured, based at least on the configurational information, assign or reassign at least one of the one or more wireless audio transmitters from a first audio channel to a second audio channel.

Clause 8. The audio system of any of Clauses 1-7, wherein the IC comprises one of: a field programmable gate array (FPGA), an application-specific integrated circuit (ASIC), an applications-specific standard product (ASSP), an application-specific instruction-set processor (ASIP), a complex programmable logic device (CPLD), a multi-project chip (MPC), or a system-on-a-chip (SoC).

Clause 9. The audio system of any of Clauses 1-8, wherein the IC comprises an FPGA and the configurational information comprises an FPGA image.

Clause 10. The audio system of any of Clauses 1-9, wherein the FPGA image is operable to cause the FPGA to configure or reconfigure the one or more antennas, cause the FPGA to accommodate the one or more transmission modes, or reconfigure the MCR to accommodate the number of audio channels.

Clause 11. The audio system of any of Clauses 1-10, wherein the FPGA image is provided to the FPGA via direct memory access.

Clause 12. The audio system of any of Clauses 1-11, wherein the one or more antennas comprise a plurality of antennas, and wherein the processor of the MCR is further configured to cause two or more of the plurality of antennas to be attuned to listen for audio data associated with a single audio channel.

Clause 13. The audio system of any of Clauses 1-12, wherein the available spectrum is determined based upon one or more digital license keys that indicate at least one of: one or more transmission modes to be accommodated, one or more modulation schemes to be accommodated, an antenna array configuration to be accommodated, a number of antennas to be accommodated, one or more audio channel types to be accommodated, a number of channels to be accommodated, a transmission capacity to be accommodated, or a number of upstream wireless audio devices to be accommodated.

Clause 14. The audio system of any of Clauses 1-13, wherein the processor of the MCR is configured to select the FPGA image based on at least one of the one or more digital license keys stored at the memory of the MCR.

Clause 15. The audio system of any of Clauses 1-14, wherein the MCR is configured to accommodate a plurality of different transmission modes.

Clause 16. The audio system of any of Clauses 1-15, wherein the MCR is configured to accommodate one or more of: different encoding schemes, different audio channel types, or different audio channel bandwidths.

Clause 17. The audio system of any of Clauses 1-16, wherein the MCR is configured to carry out one or more different radio functionalities or digital signal processing functionalities using a software-defined radio (SDR) module, a software-defined integrated circuit, or the IC.

Clause 18. An audio system comprising a multi-channel receiver (MCR) configured to receive audio data, the MCR comprising a field-programmable gate array (FPGA) and one or more antenna, the MCR being configured at least to: determine or define a plurality of audio channels for receiving audio; configure the one or more antennas to receive audio in at least a portion of the plurality of audio channels; scan, using the FPGA, for available spectrum; determine, based at least on the available spectrum, configurational information for the MCR, wherein the configurational information comprises one or more of: antenna modes, transmission modes, or a number of audio channels to be accommodated by the MCR to improve use of the available spectrum; and configure, based on the configurational information, the one or more antennas, or apply, based on the configurational information, a software-defined radio feature of the MCR.

Clause 19. The audio system of Clauses 18, wherein the FPGA is configured to select a particular FPGA image from among a set of FPGA images based on said available spectrum.

Clause 20. The audio system of any of Clauses 18-19, wherein the MCR is configured to carry out one or more different radio functionalities or digital signal processing functionalities using a software-defined radio (SDR) module, a software-defined integrated circuit, or the FPGA.

Clause 21. The audio system of any of Clauses 18-20, further comprising a network switch in wireless communication with the MCR, wherein the memory and the program code of the MCR are further configured, with the processor and the IC, to cause the MCR to at least: transmit information about the available spectrum to a network switch; and receive, from the network switch, in response to transmitting the information about the available spectrum, the configurational information, and wherein the network switch is configured to at least: receive, from the MCR, the information about available spectrum; generate the configurational information; and transmit, to the MCR, the configurational information.

Clause 22. The audio system of any of Clauses 18-21, wherein the scan for the available spectrum is carried out by only a portion of the one or more antennas.

Clause 23. The audio system of any of Clauses 18-22, wherein the scan for the available spectrum is carried out within a particular sub-band previously assigned to the MCR.

Clause 24. The audio system of any of Clauses 18-23, wherein the memory and the program code of the MCR are further configured, with the processor and the IC, to cause the MCR to at least: determine, based at least on the available spectrum and current audio channel allocation information, the configurational information.

Clause 25. The audio system of any of Clauses 18-24, wherein the MCR is configured, based at least on the configurational information, assign or reassign at least one of the one or more wireless audio transmitters from a first audio channel to a second audio channel.

Clause 26. The audio system of any of Clauses 18-25, wherein the IC comprises one of: a field programmable gate array (FPGA), an application-specific integrated circuit (ASIC), an applications-specific standard product (ASSP), an application-specific instruction-set processor (ASIP), a complex programmable logic device (CPLD), a multi-project chip (MPC), or a system-on-a-chip (SoC).

Clause 27. The audio system of any of Clauses 18-26, wherein the IC comprises an FPGA and the configurational information comprises an FPGA image.

Clause 28. The audio system of any of Clauses 18-27, wherein the FPGA image is operable to cause the FPGA to configure or reconfigure the one or more antennas, cause the FPGA to accommodate the one or more transmission modes, or reconfigure the MCR to accommodate the number of audio channels.

Clause 29. The audio system of any of Clauses 18-28, wherein the FPGA image is provided to the FPGA via direct memory access.

Clause 30. The audio system of any of Clauses 18-29, wherein the one or more antennas comprise a plurality of antennas, and wherein the processor of the MCR is further configured to cause two or more of the plurality of antennas to be attuned to listen for audio data associated with a single audio channel.

Clause 31. The audio system of any of Clauses 18-30, wherein the available spectrum is determined based upon one or more digital license keys that indicate at least one of: one or more transmission modes to be accommodated, one or more modulation schemes to be accommodated, an antenna array configuration to be accommodated, a number of antennas to be accommodated, one or more audio channel types to be accommodated, a number of channels to be accommodated, a transmission capacity to be accommodated, or a number of upstream wireless audio devices to be accommodated.

Clause 32. The audio system of any of Clauses 18-31, wherein the processor of the MCR is configured to select the FPGA image based on at least one of the one or more digital license keys stored at the memory of the MCR.

Clause 33. The audio system of any of Clauses 18-32, wherein the MCR is configured to accommodate a plurality of different transmission modes.

Clause 34. The audio system of any of Clauses 18-33, wherein the MCR is configured to accommodate one or more of: different encoding schemes, different audio channel types, or different audio channel bandwidths.

Clause 35. The audio system of any of Clauses 18-34, wherein the MCR is configured to carry out one or more different radio functionalities or digital signal processing functionalities using a software-defined radio (SDR) module, a software-defined integrated circuit, or the IC.

Clause 36. An audio system comprising a multi-channel receiver (MCR) configured to receive audio data, the MCR comprising a field-programmable gate array (FPGA) and one or more antenna, the MCR being configured at least to: determine or define a plurality of audio channels for receiving audio; configure the one or more antennas to receive audio in a first portion of the plurality of audio channels; scan, using a second portion of the plurality of audio channels, for available spectrum; determine, based at least on the available spectrum, configurational information for the MCR, wherein the configurational information comprises one or more of: antenna modes, transmission modes, or a number of audio channels to be accommodated by the MCR to improve use of the available spectrum; and configure, based on the configurational information, the one or more antennas, or apply, based on the configurational information, a software-defined radio feature of the MCR.

Clause 37. The audio system of Clauses 36, wherein the FPGA is configured to select a particular FPGA image from among a set of FPGA images based on said available spectrum.

Clause 38. The audio system of any of Clauses 36-37, wherein the MCR is configured to carry out one or more different radio functionalities or digital signal processing functionalities using a software-defined radio (SDR) module, a software-defined integrated circuit, or the FPGA.

Clause 39. The audio system of any of Clauses 36-38, further comprising a network switch in wireless communication with the MCR, wherein the memory and the program code of the MCR are further configured, with the processor and the IC, to cause the MCR to at least: transmit information about the available spectrum to a network switch; and receive, from the network switch, in response to transmitting the information about the available spectrum, the configurational information, and wherein the network switch is configured to at least: receive, from the MCR, the information about available spectrum; generate the configurational information; and transmit, to the MCR, the configurational information.

Clause 40. The audio system of any of Clauses 36-39, wherein the scan for the available spectrum is carried out by only a portion of the one or more antennas.

Clause 41. The audio system of any of Clauses 36-40, wherein the scan for the available spectrum is carried out within a particular sub-band previously assigned to the MCR.

Clause 42. The audio system of any of Clauses 36-41, wherein the memory and the program code of the MCR are further configured, with the processor and the IC, to cause the MCR to at least: determine, based at least on the available spectrum and current audio channel allocation information, the configurational information.

Clause 43. The audio system of any of Clauses 36-42, wherein the MCR is configured, based at least on the configurational information, assign or reassign at least one of the one or more wireless audio transmitters from a first audio channel to a second audio channel.

Clause 44. The audio system of any of Clauses 36-43, wherein the IC comprises one of: a field programmable gate array (FPGA), an application-specific integrated circuit (ASIC), an applications-specific standard product (ASSP), an application-specific instruction-set processor (ASIP), a complex programmable logic device (CPLD), a multi-project chip (MPC), or a system-on-a-chip (SoC).

Clause 45. The audio system of any of Clauses 36-44, wherein the IC comprises an FPGA and the configurational information comprises an FPGA image.

Clause 46. The audio system of any of Clauses 36-45, wherein the FPGA image is operable to cause the FPGA to configure or reconfigure the one or more antennas, cause the FPGA to accommodate the one or more transmission modes, or reconfigure the MCR to accommodate the number of audio channels.

Clause 47. The audio system of any of Clauses 36-46, wherein the FPGA image is provided to the FPGA via direct memory access.

Clause 48. The audio system of any of Clauses 36-47, wherein the one or more antennas comprise a plurality of antennas, and wherein the processor of the MCR is further configured to cause two or more of the plurality of antennas to be attuned to listen for audio data associated with a single audio channel.

Clause 49. The audio system of any of Clauses 36-48, wherein the available spectrum is determined based upon one or more digital license keys that indicate at least one of: one or more transmission modes to be accommodated, one or more modulation schemes to be accommodated, an antenna array configuration to be accommodated, a number of antennas to be accommodated, one or more audio channel types to be accommodated, a number of channels to be accommodated, a transmission capacity to be accommodated, or a number of upstream wireless audio devices to be accommodated.

Clause 50. The audio system of any of Clauses 36-49, wherein the processor of the MCR is configured to select the FPGA image based on at least one of the one or more digital license keys stored at the memory of the MCR.

Clause 51. The audio system of any of Clauses 36-50, wherein the MCR is configured to accommodate a plurality of different transmission modes.

Clause 52. The audio system of any of Clauses 36-51, wherein the MCR is configured to accommodate one or more of: different encoding schemes, different audio channel types, or different audio channel bandwidths.

Clause 53. The audio system of any of Clauses 36-52, wherein the MCR is configured to carry out one or more different radio functionalities or digital signal processing functionalities using a software-defined radio (SDR) module, a software-defined integrated circuit, or the IC.

Clause 54. An audio system comprising a multi-channel receiver (MCR) comprising at least one processor, at least one memory storing program codes, and a field-programmable gate array (FPGA), wherein the at least one memory and the program codes are configured, with the at least one processor, to cause the MCR at least to: determine, based on one or more digital license keys, an audio channel configuration for the MCR, wherein the audio channel configuration comprises an indication of a number of audio channels for which the MCR is to be configured to accommodate, and cause, using the at least the processor, the FPGA to configure or reconfigure a plurality of radio frequency receivers or an antenna array of the MCR such that the MCR is configured to accommodate the number of audio channels indicated by the one or more digital license keys.

Clause 55. A method comprising providing a multi-channel receiver (MCR) configured to receive audio data from one or more antennas and/or one or more wireless audio transmitters, the MCR comprising a processor configured to operate one or more software defined radio functions; a memory in operable communication with the processor, the memory storing program code; and an integrated circuit (IC) in operable communication with the processor.

Clause 56. The method of Clause 55, further comprising, causing, using the MCR, at least a portion of the IC to scan for available spectrum; determining one or more of: an antenna configuration, a transmission mode, an audio channel allocation, or a number of audio channels to be accommodated by the MCR to improve use of the available spectrum; and providing configurational information, using the processor, to the IC such that the IC can cause configuration or reconfiguration of at least one of the antennas or an audio channel allocation based on the antenna configuration, transmission mode, or the number of audio channels to be accommodated by the MCR.

Clause 57. The method of any of Clauses 55-56, further comprising: transmitting, using the MCR, information about the available spectrum to a network switch; and receiving, at the MCR, from the network switch, in response to transmitting the information about the available spectrum, the configurational information.

Clause 58. The method of any of Clauses 55-57, further comprising: receiving, at the network switch, from the MCR, the information about available spectrum; generating the configurational information; and transmitting, from the network switch, to the MCR, the configurational information.

Clause 59. The method of any of Clauses 55-58, wherein the scan for the available spectrum is carried out by only a portion of the one or more antennas.

Clause 60. The method of any of Clauses 55-59, wherein the scan for the available spectrum is carried out within a particular sub-band previously assigned to the MCR.

Clause 61. The method of any of Clauses 55-60, further comprising: determining, based at least on the available spectrum and current audio channel allocation information, the configurational information.

Clause 62. The method of any of Clauses 55-61, further comprising: assigning or reassigning, based at least on the configurational information, using the MCR, at least one of the one or more wireless audio transmitters from a first audio channel to a second audio channel.

Clause 63. The method of any of Clauses 55-62, wherein the IC comprises one of: a field programmable gate array (FPGA), an application-specific integrated circuit (ASIC), an applications-specific standard product (ASSP), an application-specific instruction-set processor (ASIP), a complex programmable logic device (CPLD), a multi-project chip (MPC), or a system-on-a-chip (SoC).

Clause 64. The method of any of Clauses 55-63, wherein the IC comprises an FPGA and the configurational information comprises an FPGA image.

Clause 65. The method of any of Clauses 55-64, wherein the FPGA image is operable to cause the FPGA to configure or reconfigure the one or more antennas, cause the FPGA to accommodate the one or more transmission modes, or reconfigure the MCR to accommodate the number of audio channels.

Clause 66. The method of any of Clauses 55-65, wherein the FPGA image is provided to the FPGA via direct memory access.

Clause 67. The method of any of Clauses 55-66, wherein the one or more antennas comprise a plurality of antennas, and wherein the processor of the MCR is further configured to cause two or more of the plurality of antennas to be attuned to listen for audio data associated with a single audio channel.

Clause 68. The method of any of Clauses 55-67, wherein the available spectrum is determined based upon one or more digital license keys that indicate at least one of: one or more transmission modes to be accommodated, one or more modulation schemes to be accommodated, an antenna array configuration to be accommodated, a number of antennas to be accommodated, one or more audio channel types to be accommodated, a number of channels to be accommodated, a transmission capacity to be accommodated, or a number of upstream wireless audio devices to be accommodated.

Clause 69. The method of any of Clauses 55-68, further comprising: selecting, using the MCR, the FPGA image based on at least one of the one or more digital license keys stored at the memory of the MCR.

Clause 70. The method of any of Clauses 55-69, further comprising: configuring the MCR to accommodate a plurality of different transmission modes.

Clause 71. The method of any of Clauses 55-70, further comprising: configuring the MCR to accommodate one or more of: different encoding schemes, different audio channel types, or different audio channel bandwidths.

Clause 72. The method of any of Clauses 55-71, further comprising: configuring the MCR to carry out one or more different radio functionalities or digital signal processing functionalities using a software-defined radio (SDR) module, a software-defined integrated circuit, or the IC.

Clause 73. A method comprising providing a multi-channel receiver (MCR) configured to receive audio data from one or more antennas and/or one or more wireless audio transmitters, the MCR comprising a processor configured to operate one or more software defined radio functions; a memory in operable communication with the processor, the memory storing program code; and an integrated circuit (IC) in operable communication with the processor.

Clause 74. The method of Clause 73, further comprising, causing, using the MCR, at least a portion of a plurality of audio channels to scan for available spectrum; determining one or more of: an antenna configuration, a transmission mode, an audio channel allocation, or a number of audio channels to be accommodated by the MCR to improve use of the available spectrum; and providing configurational information, using the processor, to the IC such that the IC can cause configuration or reconfiguration of at least one of the antennas based on the antenna configuration, transmission mode, or the number of audio channels to be accommodated by the MCR.

Clause 75. The method of any of Clauses 73-74, further comprising: transmitting, using the MCR, information about the available spectrum to a network switch; and receiving, at the MCR, from the network switch, in response to transmitting the information about the available spectrum, the configurational information.

Clause 76. The method of any of Clauses 73-75, further comprising: receiving, at the network switch, from the MCR, the information about available spectrum; generating the configurational information; and transmitting, from the network switch, to the MCR, the configurational information.

Clause 77. The method of any of Clauses 73-76, wherein the scan for the available spectrum is carried out by only a portion of the one or more antennas.

Clause 78. The method of any of Clauses 73-77, wherein the scan for the available spectrum is carried out within a particular sub-band previously assigned to the MCR.

Clause 79. The method of any of Clauses 73-78, further comprising: determining, based at least on the available spectrum and current audio channel allocation information, the configurational information.

Clause 80. The method of any of Clauses 73-79, further comprising: assigning or reassigning, based at least on the configurational information, using the MCR, at least one of the one or more wireless audio transmitters from a first audio channel to a second audio channel.

Clause 81. The method of any of Clauses 73-80, wherein the IC comprises one of: a field programmable gate array (FPGA), an application-specific integrated circuit (ASIC), an applications-specific standard product (ASSP), an application-specific instruction-set processor (ASIP), a complex programmable logic device (CPLD), a multi-project chip (MPC), or a system-on-a-chip (SoC).

Clause 82. The method of any of Clauses 73-81, wherein the IC comprises an FPGA and the configurational information comprises an FPGA image.

Clause 83. The method of any of Clauses 73-82, wherein the FPGA image is operable to cause the FPGA to configure or reconfigure the one or more antennas, cause the FPGA to accommodate the one or more transmission modes, or reconfigure the MCR to accommodate the number of audio channels.

Clause 84. The method of any of Clauses 73-83, wherein the FPGA image is provided to the FPGA via direct memory access.

Clause 85. The method of any of Clauses 73-84, wherein the one or more antennas comprise a plurality of antennas, and wherein the processor of the MCR is further configured to cause two or more of the plurality of antennas to be attuned to listen for audio data associated with a single audio channel.

Clause 86. The method of any of Clauses 73-85, wherein the available spectrum is determined based upon one or more digital license keys that indicate at least one of: one or more transmission modes to be accommodated, one or more modulation schemes to be accommodated, an antenna array configuration to be accommodated, a number of antennas to be accommodated, one or more audio channel types to be accommodated, a number of channels to be accommodated, a transmission capacity to be accommodated, or a number of upstream wireless audio devices to be accommodated.

Clause 87. The method of any of Clauses 73-86, further comprising: selecting, using the MCR, the FPGA image based on at least one of the one or more digital license keys stored at the memory of the MCR.

Clause 88. The method of any of Clauses 73-87, further comprising: configuring the MCR to accommodate a plurality of different transmission modes.

Clause 89. The method of any of Clauses 73-88, further comprising: configuring the MCR to accommodate one or more of: different encoding schemes, different audio channel types, or different audio channel bandwidths.

Clause 90. The method of any of Clauses 73-89, further comprising: configuring the MCR to carry out one or more different radio functionalities or digital signal processing functionalities using a software-defined radio (SDR) module, a software-defined integrated circuit, or the IC.

Clause 91. An audio system comprising a multi-channel receiver (MCR) configured to receive audio data, the MCR comprising a field-programmable gate array (FPGA) and one or more antenna, the MCR being configured at least to: determine or define a plurality of audio channels for receiving audio; configure the one or more antennas to receive audio in a first portion of the plurality of audio channels; scan, using a second portion of the plurality of audio channels, for available spectrum; determine, based at least on the available spectrum, configurational information for the MCR, wherein the configurational information comprises one or more of: antenna modes, transmission modes, or a number of audio channels to be accommodated by the MCR to improve use of the available spectrum; and configure, based on the configurational information, the one or more antennas, or apply, based on the configurational information, a software-defined radio feature of the MCR.

Clause 92. The audio system of Clauses 91, wherein the FPGA is configured to select a particular FPGA image from among a set of FPGA images based on said available spectrum.

Clause 93. The audio system of any of Clauses 91-92, wherein the MCR is configured to carry out one or more different radio functionalities or digital signal processing functionalities using a software-defined radio (SDR) module, a software-defined integrated circuit, or the FPGA.

Clause 94. The audio system of any of Clauses 91-93, further comprising a network switch in wireless communication with the MCR, wherein the memory and the program code of the MCR are further configured, with the processor and the IC, to cause the MCR to at least: transmit information about the available spectrum to a network switch; and receive, from the network switch, in response to transmitting the information about the available spectrum, the configurational information, and wherein the network switch is configured to at least: receive, from the MCR, the information about available spectrum; generate the configurational information; and transmit, to the MCR, the configurational information.

Clause 95. The audio system of any of Clauses 91-94, wherein the scan for the available spectrum is carried out by only a portion of the one or more antennas.

Clause 96. The audio system of any of Clauses 91-95, wherein the scan for the available spectrum is carried out within a particular sub-band previously assigned to the MCR.

Clause 97. The audio system of any of Clauses 91-96, wherein the memory and the program code of the MCR are further configured, with the processor and the IC, to cause the MCR to at least: determine, based at least on the available spectrum and current audio channel allocation information, the configurational information.

Clause 98. The audio system of any of Clauses 91-97, wherein the MCR is configured, based at least on the configurational information, assign or reassign at least one of the one or more wireless audio transmitters from a first audio channel to a second audio channel.

Clause 99. The audio system of any of Clauses 91-98, wherein the IC comprises one of: a field programmable gate array (FPGA), an application-specific integrated circuit (ASIC), an applications-specific standard product (ASSP), an application-specific instruction-set processor (ASIP), a complex programmable logic device (CPLD), a multi-project chip (MPC), or a system-on-a-chip (SoC).

Clause 100. The audio system of any of Clauses 91-99, wherein the IC comprises an FPGA and the configurational information comprises an FPGA image.

Clause 101. The audio system of any of Clauses 91-100, wherein the FPGA image is operable to cause the FPGA to configure or reconfigure the one or more antennas, cause the FPGA to accommodate the one or more transmission modes, or reconfigure the MCR to accommodate the number of audio channels.

Clause 102. The audio system of any of Clauses 91-101, wherein the FPGA image is provided to the FPGA via direct memory access.

Clause 103. The audio system of any of Clauses 91-102, wherein the one or more antennas comprise a plurality of antennas, and wherein the processor of the MCR is further configured to cause two or more of the plurality of antennas to be attuned to listen for audio data associated with a single audio channel.

Clause 104. The audio system of any of Clauses 91-103, wherein the available spectrum is determined based upon one or more digital license keys that indicate at least one of: one or more transmission modes to be accommodated, one or more modulation schemes to be accommodated, an antenna array configuration to be accommodated, a number of antennas to be accommodated, one or more audio channel types to be accommodated, a number of channels to be accommodated, a transmission capacity to be accommodated, or a number of upstream wireless audio devices to be accommodated.

Clause 105. The audio system of any of Clauses 91-104, wherein the processor of the MCR is configured to select the FPGA image based on at least one of the one or more digital license keys stored at the memory of the MCR.

Clause 106. The audio system of any of Clauses 91-105, wherein the MCR is configured to accommodate a plurality of different transmission modes.

Clause 107. The audio system of any of Clauses 91-106, wherein the MCR is configured to accommodate one or more of: different encoding schemes, different audio channel types, or different audio channel bandwidths.

Clause 108. The audio system of any of Clauses 91-107, wherein the MCR is configured to carry out one or more different radio functionalities or digital signal processing functionalities using a software-defined radio (SDR) module, a software-defined integrated circuit, or the IC.

Clause 109. An audio system comprising a multi-channel receiver (MCR) comprising at least one processor, at least one memory storing program codes, and a field-programmable gate array (FPGA), wherein the at least one memory and the program codes are configured, with the at least one processor, to cause the MCR at least to: determine, based on one or more digital license keys, an audio channel configuration for the MCR, wherein the audio channel configuration comprises an indication of a number of audio channels for which the MCR is to be configured to accommodate, and cause, using the at least the processor, the FPGA to configure or reconfigure a plurality of radio frequency receivers or an antenna array of the MCR such that the MCR is configured to accommodate the number of audio channels indicated by the one or more digital license keys.

Clause 110. An audio receiver comprising: a processor; a memory in operable communication with the processor, the memory storing program code and configured to store one or more digital license keys; a field programmable gate array in operable communication with the processor; a software-defined integrated circuit in operable communication with the field programmable gate array; a plurality of radio frequency receivers in operable communication with the field programmable gate array and the processor; and an antenna array in operable communication with the plurality of radio frequency receivers, wherein the memory and the program code are configured, with the processor, to: determine, based on the one or more digital license keys, an audio channel configuration for the audio receiver, wherein the audio channel configuration comprises an indication of a number of audio channels for which the audio receiver is to be configured to accommodate, and cause, using at least the processor, the field programmable gate array, and the software-defined integrated circuit, reconfiguration of the plurality of radio frequency receivers or the antenna array such that the audio receiver is configured to accommodate the number of audio channels indicated by the one or more digital license keys.

Clause 111. A method comprising: determining, using at least a processor, based on one or more digital license keys, an audio channel configuration for an audio receiver, wherein the audio channel configuration comprises an indication of a number of audio channels for which the audio receiver is to be configured to accommodate, and causing, using at least the processor, a field programmable gate array, and a software-defined integrated circuit, reconfiguration of a plurality of radio frequency receivers or an antenna array of the audio receiver such that the audio receiver is configured to accommodate the number of audio channels indicated by the one or more digital license keys.

Clause 112. A multi-channel receiver (MCR) configured to receive audio data from one or more wireless audio transmitters, the MCR comprising: a processor configured to operate one or more software defined radio functions; a memory in operable communication with the processor, the memory storing program code; and an integrated circuit (IC) in operable communication with the processor, wherein the memory and the program code are configured, with the processor and the IC, to cause the MCR to at least: cause one or more antennas to scan for available spectrum; determine one of an antenna configuration for the MCR, one or more transmission modes to be accommodated by the MCR, or a number of audio channels to be accommodated by the MCR to improve use of the available spectrum; and provide configurational information, using the processor, to the IC.

Clause 113. The MCR of Clause 112, wherein the IC comprises one of: a field programmable gate array (FPGA), an application-specific integrated circuit (ASIC), an applications-specific standard product (ASSP), an application-specific instruction-set processor (ASIP), a complex programmable logic device (CPLD), a multi-project chip (MPC), or a system-on-a-chip (SoC).

Clause 114. The MCR of any of Clauses 112-113, wherein the IC comprises an FPGA and the configurational information comprises an FPGA image.

Clause 115. The MCR of any of Clauses 112-114, wherein the FPGA image is operable to cause the FPGA to configure or reconfigure the one or more antenna, cause the FPGA to accommodate the one or more transmission modes, or reconfigure the MCR to accommodate the number of audio channels.

Clause 116. The MCR of any of Clauses 112-115, wherein the memory and the program code are configured, with the processor and the IC, to cause the MCR to at least: cause the one or more wireless audio transmitters to be configured for the one or more transmission modes; or cause the one or more wireless audio transmitters to be assigned to the number of audio channels for which the MCR is reconfigured to accommodate.

Clause 117. The MCR of any of Clauses 112-116, further comprising: a plurality of radio frequency receivers in operable communication with the IC and the processor; and an antenna array in operable communication with the plurality of radio frequency receivers or the processor.

Clause 118. The MCR of any of Clauses 112-117, wherein the processor is further configured to cause two or more antennas of the antenna array to be attuned to listen for audio data associated with a single audio channel.

Clause 119. The MCR of any of Clauses 112-118, wherein the memory is further configured to store one or more digital license keys.

Clause 120. The MCR of any of Clauses 112-119, wherein the one or more digital license keys indicate at least one of: one or more transmission modes to be accommodated, one or more modulation schemes to be accommodated, an antenna array configuration to be accommodated, a number of antennas to be accommodated, one or more audio channel types to be accommodated, a number of channels to be accommodated, a transmission capacity to be accommodated, or a number of upstream wireless audio devices to be accommodated.

Clause 121. The MCR of any of Clauses 112-120, wherein the processor is configured to select the FPGA image based on at least one of the one or more digital license keys stored at the memory.

Clause 122. The MCR of any of Clauses 112-121, wherein the MCR is configured to accommodate a plurality of different transmission modes.

Clause 123. The MCR of any of Clauses 112-122, wherein the MCR is configured to accommodate a plurality of different encoding schemes.

Clause 124. The MCR of any of Clauses 112-123, wherein the MCR is configured to accommodate a plurality of different audio channel types.

Clause 125. The MCR of any of Clauses 112-124, wherein the MCR is configured to accommodate a plurality of different audio channel bandwidths.

Clause 126. The MCR of any of Clauses 112-125, wherein the MCR is configured to carry out one or more different radio functionalities or digital signal processing functionalities using a software-defined radio (SDR) module, a software-defined integrated circuit, or the IC.

Clause 127. The MCR of any of Clauses 112-126, wherein the memory and the program code are further configured, with the processor and the IC, to cause the MCR to at least: facilitate deployment of a plurality of wireless radio frequency transmitters in the audio system based upon the available spectrum and the FPGA image.

Clause 128. An audio system comprising: one or more wireless audio transmitters configured to transmit audio data; one or more antennas configured to receive the audio data transmitted by the one or more wireless audio transmitters; and a multi-channel receiver (MCR) configured to receive the audio data from the one or more antennas, the MCR comprising: a processor configured to operate one or more software defined radio functions; a memory in operable communication with the processor, the memory storing program code; and an integrated circuit (IC) in operable communication with the processor, wherein the memory and the program code are configured, with the processor and the IC, to cause the MCR to at least: cause the one or more antennas to scan for available spectrum; determine one of an antenna configuration for the MCR, one or more transmission modes to be accommodated by the MCR, or a number of audio channels to be accommodated by the MCR to improve use of the available spectrum; and provide configurational information, using the processor, to the IC.

Clause 129. The audio system of Clause 128, wherein the IC comprises one of: a field programmable gate array (FPGA), an application-specific integrated circuit (ASIC), an applications-specific standard product (ASSP), an application-specific instruction-set processor (ASIP), a complex programmable logic device (CPLD), a multi-project chip (MPC), or a system-on-a-chip (SoC).

Clause 130. The audio system of any of Clauses 128-129, wherein the IC comprises an FPGA and the configurational information comprises an FPGA image.

Clause 131. The audio system of any of Clauses 128-130, wherein the FPGA image is operable to cause the FPGA to configure or reconfigure the one or more antenna, cause the FPGA to accommodate the one or more transmission modes, or reconfigure the MCR to accommodate the number of audio channels.

Clause 132. The audio system of any of Clauses 128-131, wherein the FPGA image is provided to the FPGA via direct memory access.

Clause 133. The audio system of any of Clauses 128-132, wherein the memory and the program code of the MCR are configured, with the processor and the IC of the MCR, to cause the MCR to at least: cause the one or more wireless audio transmitters to be configured for the one or more transmission modes; or cause the one or more wireless audio transmitters to be assigned to said number of audio channels for which the MCR is reconfigured to accommodate.

Clause 134. The audio system of any of Clauses 128-133, wherein the MCR further comprises: a plurality of radio frequency receivers in operable communication with the IC and the processor.

Clause 135. The audio system of any of Clauses 128-134, wherein the one or more antennas comprise a plurality of antennas, and wherein the processor of the MCR is further configured to cause two or more of the plurality of antennas to be attuned to listen for audio data associated with a single audio channel.

Clause 136. The audio system of any of Clauses 128-135, wherein the memory of the MCR is further configured to store one or more digital license keys.

Clause 137. The audio system of any of Clauses 128-136, wherein the one or more digital license keys indicate at least one of: one or more transmission modes to be accommodated, one or more modulation schemes to be accommodated, an antenna array configuration to be accommodated, a number of antennas to be accommodated, one or more audio channel types to be accommodated, a number of channels to be accommodated, a transmission capacity to be accommodated, or a number of upstream wireless audio devices to be accommodated.

Clause 138. The audio system of any of Clauses 128-137, wherein the processor of the MCR is configured to select the FPGA image based on at least one of the one or more digital license keys stored at the memory of the MCR.

Clause 139. The audio system of any of Clauses 128-138, wherein the MCR is configured to accommodate a plurality of different transmission modes.

Clause 140. The audio system of any of Clauses 128-139, wherein the MCR is configured to accommodate a plurality of different encoding schemes.

Clause 141. The audio system of any of Clauses 128-140, wherein the MCR is configured to accommodate a plurality of different audio channel types.

Clause 142. The audio system of any of Clauses 128-141, wherein the MCR is configured to accommodate a plurality of different audio channel bandwidths.

Clause 143. The audio system of any of Clauses 128-142, wherein the MCR is configured to carry out one or more different radio functionalities or digital signal processing functionalities using a software-defined radio (SDR) module, a software-defined integrated circuit, or the IC.

Clause 144. The audio system of any of Clauses 128-143, wherein the memory of the MCR and the program code of the MCR are further configured, with the processor of the MCR and the IC of the MCR, to cause the MCR to at least: facilitate deployment of a plurality of wireless radio frequency transmitters in the audio system based upon the available spectrum and the FPGA image.

Clause 145. A method comprising: causing one or more antennas of a wireless audio system to scan for available spectrum; determining one of an antenna configuration for a multi-channel receiver (MCR), one or more transmission modes to be accommodated by the MCR, or a number of audio channels to be accommodated by the MCR to improve use of the available spectrum; providing, to a field-programmable gate array (FPGA) of the MCR, an FPGA image, the FPGA image being operable to cause the FPGA to configure or reconfigure the one or more antennas according to the antenna configuration, cause the FPGA to accommodate the one or more transmission modes, or reconfigure the MCR to accommodate the number of audio channels.

Clause 146. The method of Clause 145, wherein the FPGA image is provided to the FPGA via direct memory access.

Clause 147. The method of any of Clauses 145-146, further comprising: causing one or more wireless audio transmitters in the wireless audio system to be configured for the one or more transmission modes; or causing the one or more wireless audio transmitters to be assigned to said number of audio channels for which the MCR is reconfigured to accommodate.

Clause 148. The method of any of Clauses 145-147, further comprising: storing, in a memory of the MCR, one or more digital license keys associated with one or more users of the audio system.

Clause 149. The method of any of Clauses 145-148, wherein the one or more digital license keys indicate at least one of: one or more transmission modes to be accommodated, one or more modulation schemes to be accommodated, an antenna array configuration to be accommodated, a number of antennas to be accommodated, one or more audio channel types to be accommodated, a number of channels to be accommodated, a transmission capacity to be accommodated, or a number of upstream wireless audio devices to be accommodated.

Clause 150. The method of any of Clauses 145-149, further comprising: selecting, using the MCR, the FPGA image based on at least one of the one or more digital license keys stored at the memory of the MCR.

Clause 151. The method of any of Clauses 145-150, wherein the MCR is configured to accommodate a plurality of different transmission modes.

Clause 152. The method of any of Clauses 145-151, wherein the MCR is configured to accommodate a plurality of different encoding schemes.

Clause 153. The method of any of Clauses 145-152, wherein the MCR is configured to accommodate a plurality of different audio channel types.

Clause 154. The method of any of Clauses 145-153, wherein the MCR is configured to accommodate a plurality of different audio channel bandwidths.

Clause 155. The method of any of Clauses 145-154, wherein the MCR is configured to carry out one or more different radio functionalities or digital signal processing functionalities using a software-defined radio (SDR) module, a software-defined integrated circuit, or the FPGA.

Clause 156. The method of any of Clauses 145-155, further comprising: facilitating deployment of a plurality of wireless radio frequency transmitters in the audio system based upon the available spectrum and the FPGA image.

Clause 157. An audio system comprising: means for causing at least a portion of a plurality of audio channels to scan for available spectrum; means for determining one or more of: an antenna configuration, a transmission mode, an audio channel allocation, or a number of audio channels to be accommodated to improve use of the available spectrum; means for providing configurational information; and means for causing configuration or reconfiguration of at least one antenna, software-defined radio element, or audio channel allocation based on the antenna configuration, transmission mode, or the number of audio channels to be accommodated.

Clause 158. The audio system of Clause 157, further comprising: means for transmitting, using the MCR, information about the available spectrum to a network switch; and means for receiving, at the MCR, from the network switch, in response to transmitting the information about the available spectrum, the configurational information.

Clause 159. The audio system of any of Clauses 157-158 further comprising: means for receiving, at the network switch, from the MCR, the information about available spectrum; and means for generating the configurational information; and transmitting, from the network switch, to the MCR, the configurational information.

Clause 160. The audio system of any of Clauses 157-159, wherein the scan for the available spectrum is carried out by only a portion of the one or more antennas.

Clause 161. The audio system of any of Clauses 157-160, wherein the scan for the available spectrum is carried out within a particular sub-band previously assigned to the MCR.

Clause 162. The audio system of any of Clauses 157-161, further comprising: means for determining, based at least on the available spectrum and current audio channel allocation information, the configurational information.

Clause 163. The audio system of any of Clauses 157-162, further comprising: means for assigning or reassigning, based at least on the configurational information, using the MCR, at least one of the one or more wireless audio transmitters from a first audio channel to a second audio channel.

Clause 164. The audio system of any of Clauses 157-163, wherein the IC comprises one of: a field programmable gate array (FPGA), an application-specific integrated circuit (ASIC), an applications-specific standard product (ASSP), an application-specific instruction-set processor (ASIP), a complex programmable logic device (CPLD), a multi-project chip (MPC), or a system-on-a-chip (SoC).

Clause 165. The audio system of any of Clauses 157-164, wherein the IC comprises an FPGA and the configurational information comprises an FPGA image.

Clause 166. The audio system of any of Clauses 157-165, wherein the FPGA image is operable to cause the FPGA to configure or reconfigure the one or more antennas, cause the FPGA to accommodate the one or more transmission modes, or reconfigure the MCR to accommodate the number of audio channels.

Clause 167. The audio system of any of Clauses 157-166, wherein the FPGA image is provided to the FPGA via direct memory access.

Clause 168. The audio system of any of Clauses 157-167, wherein the one or more antennas comprise a plurality of antennas, and wherein the processor of the MCR is further configured to cause two or more of the plurality of antennas to be attuned to listen for audio data associated with a single audio channel.

Clause 169. The audio system of any of Clauses 157-168, wherein the available spectrum is determined based upon one or more digital license keys that indicate at least one of: one or more transmission modes to be accommodated, one or more modulation schemes to be accommodated, an antenna array configuration to be accommodated, a number of antennas to be accommodated, one or more audio channel types to be accommodated, a number of channels to be accommodated, a transmission capacity to be accommodated, or a number of upstream wireless audio devices to be accommodated.

Clause 170. The audio system of any of Clauses 157-169, further comprising: means for selecting, using the MCR, the FPGA image based on at least one of the one or more digital license keys stored at the memory of the MCR.

Clause 171. The audio system of any of Clauses 157-170, further comprising: means for configuring the MCR to accommodate a plurality of different transmission modes.

Clause 172. The audio system of any of Clauses 157-171, further comprising: means for configuring the MCR to accommodate one or more of: different encoding schemes, different audio channel types, or different audio channel bandwidths.

Clause 173. The audio system of any of Clauses 157-172, further comprising: means for configuring the MCR to carry out one or more different radio functionalities or digital signal processing functionalities using a software-defined radio (SDR) module, a software-defined integrated circuit, or the IC.

Clause 174. A audio system comprising: means for determining, based on one or more digital license keys, an audio channel configuration for an audio receiver, wherein the audio channel configuration comprises an indication of a number of audio channels for which the audio receiver is to be configured to accommodate, and causing, using at least the processor, a field programmable gate array, and a software-defined integrated circuit, reconfiguration of a plurality of radio frequency receivers or an antenna array of the audio receiver such that the audio receiver is configured to accommodate the number of audio channels indicated by the one or more digital license keys.

Clause 175. A audio system comprising: means for causing one or more antennas of a wireless audio system to scan for available spectrum; means for determining one of an antenna configuration for a multi-channel receiver (MCR), one or more transmission modes to be accommodated by the MCR, or a number of audio channels to be accommodated by the MCR to improve use of the available spectrum; means for providing, to a field-programmable gate array (FPGA) of the MCR, an FPGA image, the FPGA image being operable to cause the FPGA to configure or reconfigure the one or more antennas according to the antenna configuration, cause the FPGA to accommodate the one or more transmission modes, or reconfigure the MCR to accommodate the number of audio channels.

Clause 176. The audio system of Clause 175, wherein the FPGA image is provided to the FPGA via direct memory access.

Clause 177. The audio system of any of Clauses 175-176, further comprising: causing one or more wireless audio transmitters in the wireless audio system to be configured for the one or more transmission modes; or causing the one or more wireless audio transmitters to be assigned to said number of audio channels for which the MCR is reconfigured to accommodate.

Clause 178. The audio system of any of Clauses 175-177, further comprising: storing, in a memory of the MCR, one or more digital license keys associated with one or more users of the audio system.

Clause 179. The audio system of any of Clauses 175-178, wherein the one or more digital license keys indicate at least one of: one or more transmission modes to be accommodated, one or more modulation schemes to be accommodated, an antenna array configuration to be accommodated, a number of antennas to be accommodated, one or more audio channel types to be accommodated, a number of channels to be accommodated, a transmission capacity to be accommodated, or a number of upstream wireless audio devices to be accommodated.

Clause 180. The audio system of any of Clauses 175-179, further comprising: selecting, using the MCR, the FPGA image based on at least one of the one or more digital license keys stored at the memory of the MCR.

Clause 181. The audio system of any of Clauses 175-180, wherein the MCR is configured to accommodate a plurality of different transmission modes.

Clause 182. The audio system of any of Clauses 175-181, wherein the MCR is configured to accommodate a plurality of different encoding schemes.

Clause 183. The audio system of any of Clauses 175-182, wherein the MCR is configured to accommodate a plurality of different audio channel types.

Clause 184. The audio system of any of Clauses 175-183, wherein the MCR is configured to accommodate a plurality of different audio channel bandwidths.

Clause 185. The audio system of any of Clauses 175-184, wherein the MCR is configured to carry out one or more different radio functionalities or digital signal processing functionalities using a software-defined radio (SDR) module, a software-defined integrated circuit, or the FPGA.

Clause 186. The audio system of any of Clauses 175-185, further comprising: facilitating deployment of a plurality of wireless radio frequency transmitters in the audio system based upon the available spectrum and the FPGA image.

Clause 187. A computing device comprising: one or more processors; and memory storing instructions that, when executed, cause the computing device to perform the method of any one of Clauses 55-90, 111, or 145-156.

Clause 188. A system comprising: one or more computing devices configured to perform the method of any one of Clauses 55-90, 111, or 145-156.

Clause 189. A computer-readable medium storing instructions that, when executed, cause the performance of the method of any one of Clauses 55-90, 111, or 145-156.

What is claimed is:

1. An audio system comprising:
one or more wireless audio transmitters configured to transmit audio data; and
one or more antennas configured to receive the audio data transmitted by the one or more wireless audio transmitters; and
a multi-channel receiver (MCR) configured to receive the audio data from the one or more antennas, the MCR comprising:
a processor configured to operate one or more software defined radio functions;
a memory in operable communication with the processor, the memory storing program code; and
a field programmable gate array (FPGA) in operable communication with the processor,
wherein the memory and the program code are configured, with the processor, to cause the MCR to at least:
cause at least a portion of the IC-FPGA to scan for available spectrum using at least one of the one or more antennas;
determine one or more of: an antenna configuration, a transmission mode, an audio channel allocation, or a number of audio channels to be accommodated by the MCR to improve use of the available spectrum; and
provide configurational information, using the processor, to the FPGA such that the FPGA can cause configuration or reconfiguration of: at least one of the antennas based on the antenna configuration, the transmission mode, or the number of audio channels to be accommodated by the MCR.

2. The audio system of claim 1, further comprising:
a network switch in wireless communication with the MCR,
wherein the memory and the program code of the MCR are further configured, with the processor and the FPGA, to cause the MCR to at least:
transmit information about the available spectrum to a network switch; and
receive, from the network switch, in response to transmitting the information about the available spectrum, the configurational information, and
wherein the network switch is configured to at least:
receive, from the MCR, the information about available spectrum;
generate the configurational information; and
transmit, to the MCR, the configurational information.

3. The audio system of claim 1, wherein the scan for available spectrum is carried out by only a portion of the one or more antennas.

4. The audio system of claim 1, wherein the scan for available spectrum is carried out within a particular sub-band previously assigned to the MCR.

5. The audio system of claim 1, wherein the memory and the program code of the MCR are further configured, with the processor and the FPGA, to cause the MCR to at least:
determine, based at least on the available spectrum and current audio channel allocation information, the configurational information.

6. The audio system of claim 1, wherein the MCR is configured, based at least on the configurational information, assign or reassign at least one of the one or more wireless audio transmitters from a first audio channel to a second audio channel.

7. The audio system of claim 1, wherein the memory and the program code are configured, with the processor, to further cause the MCR to at least:
determine an initial audio channel allocation for a plurality of audio channels within a first candidate channelization portion of the available spectrum.

8. The audio system of claim 7, wherein the memory and the program code are configured, with the processor, to further cause the MCR to at least:
receive digitized audio associated with at least one of the plurality of audio channels within one or more audio payload carrying sub-bands of the first candidate channelization portion of the available spectrum; and
identify the one or more audio payload carrying sub-bands within the first candidate channelization portion of the available spectrum based on the initial audio channel allocation.

9. The audio system of claim 8, wherein the memory and the program code are configured, with the processor, to further cause the MCR to at least:
cause at least a portion of the FPGA to carry out a second scan for available spectrum using at least one of the one or more antennas; and
determine, based at least on said second scan for available spectrum, a subsequent audio channel allocation for the plurality of audio channels within the first candidate channelization portion of the available spectrum or within a second candidate channelization portion of the available spectrum,
wherein the MCR is configured to cause at least the portion of the FPGA to carry out said second scan for available spectrum simultaneously with receiving the digitized audio, identifying the one or more audio payload carrying sub-bands within the first candidate channelization portion of the available spectrum, and/ or demodulating the digitized audio associated with the at least one of the plurality of audio channels.

10. The audio system of claim 1, wherein the configurational information comprises an FPGA image, wherein the FPGA image is operable to cause the FPGA to configure or reconfigure the one or more antennas, cause the FPGA to accommodate the transmission modes, or cause the FPGA to reconfigure the MCR to accommodate the number of audio channels.

11. The audio system of claim 1, wherein the one or more antennas comprise a plurality of antennas, and wherein the processor of the MCR is further configured to cause two or more of the plurality of antennas to be attuned to listen for audio data a single audio channel.

12. The audio system of claim 1, wherein the available spectrum is determined based upon one or more digital license keys that indicate at least one of: one or more transmission modes to be accommodated, one or more modulation schemes to be accommodated, an antenna array configuration to be accommodated, a number of antennas to be accommodated, one or more audio channel types to be accommodated, a number of channels to be accommodated, a transmission capacity to be accommodated, or a number of upstream wireless audio devices to be accommodated.

13. The audio system of claim 10, wherein the processor of the MCR is configured to select the FPGA image based on at least one of the one or more digital license keys stored at the memory of the MCR.

14. The audio system of claim 1, wherein the MCR is configured to accommodate a plurality of different transmission modes.

15. The audio system of claim 1, wherein the MCR is configured to accommodate one or more of: different encoding schemes, different audio channel types, or different audio channel bandwidths.

16. The audio system of claim 1, wherein the MCR is configured to carry out one or more different radio functionalities or digital signal processing functionalities using a software-defined radio (SDR) module, a software-defined integrated circuit, or the FPGA.

17. An audio system comprising:

a multi-channel receiver (MCR) configured to receive audio data, the MCR comprising a field-programmable gate array (FPGA) and one or more antenna, the MCR being configured at least to:

determine or define a plurality of audio channels for receiving audio;

configure the one or more antennas to receive audio in at least a portion of the plurality of audio channels;

scan, using at least a portion of the FPGA, for available spectrum;

determine, based at least on the available spectrum, configurational information for the MCR, wherein the configurational information comprises one or more of: antenna modes, transmission modes, or a number of audio channels to be accommodated by the MCR to improve use of the available spectrum; and configure, based on the configurational information and using the FPGA, the one or more antennas.

18. The audio system of claim 17, wherein the FPGA is configured to select a particular FPGA image from among a set of FPGA images based on said available spectrum.

19. The audio system of claim 17, wherein the MCR is configured to carry out one or more different radio functionalities or digital signal processing functionalities using a software-defined radio (SDR) module, a software-defined integrated circuit, or the FPGA.

20. A method comprising:

scanning, by a multi-channel receiver (MCR), for available spectrum using at least a portion of a field-programmable gate array (FPGA) of the MCR and at least one of one or more antennas;

determining one or more of: an antenna configuration, a transmission mode, an audio channel allocation, or a number of audio channels to be accommodated by the MCR to improve use of the available spectrum; and providing configurational information to the FPGA such that the FPGA can cause configuration or reconfiguration of: at least one of the antennas based on the antenna configuration, the transmission mode, or the number of audio channels to be accommodated by the MCR.

* * * * *